United States Patent
Gozalo et al.

(10) Patent No.: US 10,647,835 B2
(45) Date of Patent: May 12, 2020

(54) WEAR-RESISTANT RUBBER COMPOSITIONS, SYSTEMS, AND METHODS

(71) Applicant: WEIR SLURRY GROUP, INC., Madison, WI (US)

(72) Inventors: Francisco A. Gozalo, Sandy, UT (US); Sanford W. Clark, Salt Lake, UT (US); Tham Meng, Madison, WI (US); Timothy Lane, Madison, WI (US)

(73) Assignee: Weir Slurry Group, Inc., Madison, WI (US)

(*) Notice: Subject to any disclaimer, the term of this patent is extended or adjusted under 35 U.S.C. 154(b) by 904 days.

(21) Appl. No.: 15/250,726

(22) Filed: Aug. 29, 2016

(65) Prior Publication Data

US 2018/0057664 A1 Mar. 1, 2018

(51) Int. Cl.
*B02C 17/22* (2006.01)
*C08L 7/00* (2006.01)
*C08L 9/00* (2006.01)

(52) U.S. Cl.
CPC .............. *C08L 7/00* (2013.01); *B02C 17/225* (2013.01); *C08L 9/00* (2013.01); *B02C 2210/02* (2013.01); *C08L 2201/08* (2013.01); *C08L 2205/025* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| 6,107,379 A | 8/2000 | Kamata et al. |
| 6,255,397 B1 | 7/2001 | Sandstrom |
| 2014/0203129 A1* | 7/2014 | Williams .............. B02C 17/225 241/183 |

FOREIGN PATENT DOCUMENTS

| CN | 104194085 A | 12/2014 | |
| CN | 104419023 A | 3/2015 | |
| CN | 204685206 U | * 10/2015 | ............. B02C 17/22 |
| CN | 105199153 A | * 12/2015 | ............... C08L 7/00 |
| EP | 2700670 A1 | 2/2014 | |
| WO | 8101253 A1 | 5/1981 | |

OTHER PUBLICATIONS

Machine translation of CN-105199153-A (no date).*
Machine translation of CN-204685206-U (no date).*
International Search Report and Written Opinion dated May 24, 2017 in connection with International Application No. PCT/US2016/049317, 14 pages.
Extended European Search Report dated Jan. 17, 2020 in connection with European Application No. 16915353.3, 8 pages.
Clarivate Analytics, Database WPI Week 201633, Thomson Scientific, London, Great Britain, AN 2016-04382E, XP002976627, 2017, 2 pages.

* cited by examiner

*Primary Examiner* — Michael J Feely
(74) *Attorney, Agent, or Firm* — Baker & McKenzie LLP

(57) ABSTRACT

This disclosure relates to wear-resistant rubber compositions, such as those, for example, comprising at least one hydroxy-terminated polybutadiene, at least one natural rubber, at least one polymerization accelerant; at least one sulfur; and at least one polybutadiene, wherein the wear-resistant rubber composition may have an effective cross-linking density of at least about $30 \times 10^{-5}$ moles/cm$^3$.

22 Claims, 6 Drawing Sheets

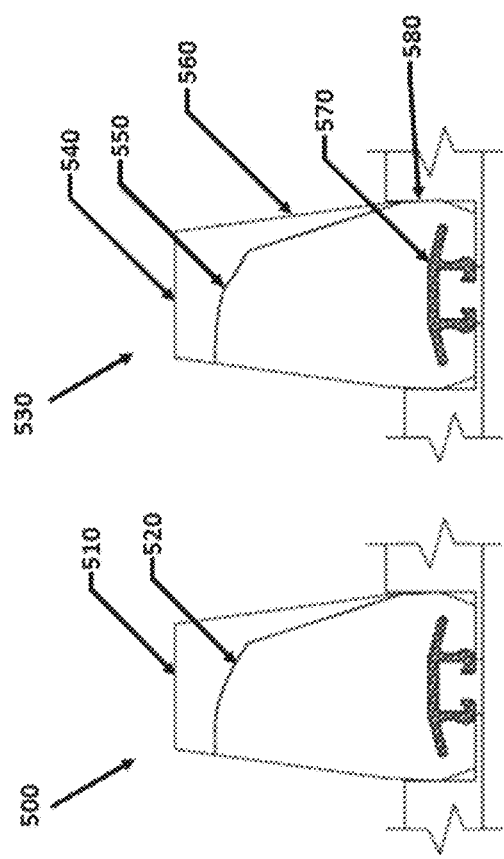
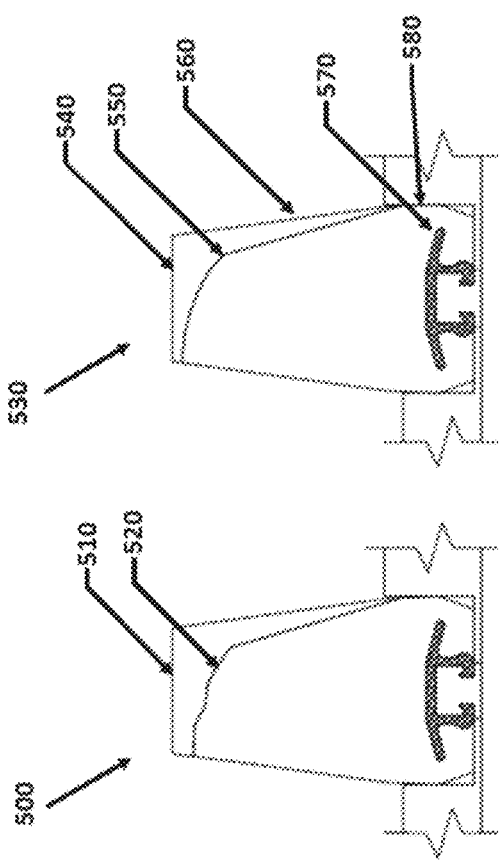
FIG. 6A
FIG. 6B

WEAR-RESISTANT RUBBER COMPOSITIONS, SYSTEMS, AND METHODS

FIELD OF THE DISCLOSURE

The present disclosure relates, in some embodiments, to wear-resistant rubber compositions and, more particularly, to wear-resistant rubber compositions for use with mining equipment including, for example, wear-resistant lifter bar assemblies. The present disclosure also relates, in some embodiments, to systems and methods for damp shock absorption by wear-resistant rubber compositions.

BACKGROUND OF THE DISCLOSURE

Wear-resistant rubber compositions may be used in automotive, construction, and mining industries. For example, in the mining industry, a grinding mill comprising a cylindrical drum, grinding balls, an opening on each end, at least one lifter bar, and material to be ground. As the grinding mill rotates about its z-axis, lifter bars lift the material to be ground and the grinding balls, and then the material to be ground and the grinding balls drop away from the lifter bars, wherein the material to be ground is ground between a combination of the grinding balls, the inside walls of the cylindrical drum, and other lifter bars. Lifter bars become worn through this grinding action and must be regularly replaced, which increases monetary costs of milling operations as well as decreases the fidelity of ground materials.

Alternatively, structures such as bridges and buildings require a shock absorber and/or damper to damp shock impulses, thereby dissipating kinetic energy created through movement of the structures themselves or the environment surrounding the structures. Unabsorbed shock impulses damage structures directly, thereby creating costly repairs that must be made to the structures. Similar shock absorption is needed in the automotive industry, for example, to damp shock impulses from engine function and to absorb friction created through an automotive suspension system.

SUMMARY

Accordingly, a need has arisen for improved wear-resistant rubber compositions with advantageous processability and effective cross-linking density.

The present disclosure relates, according to some embodiments, a wear-resistant rubber composition may comprise at least one hydroxy-terminated polybutadiene; at least one natural rubber; at least one polymerization accelerant; at least one sulfur; and at least one polybutadiene, wherein the wear-resistant rubber composition may have an effective cross-linking density of at least about $30 \times 10^{-5}$ moles/cm$^3$. In some embodiments, a wear-resistant rubber composition may also comprise at least one antiozonant; at least one vulcanization inhibitor; at least one silica; at least one processing additive; at least one coupling agent; or combinations thereof. A wear-resistant rubber composition may also comprise an organosilane additive; at least one peptizer; at least one plasticizer; at least one carbon black; or combinations thereof, according to some embodiments. According to some embodiments, at least one natural rubber may be present at a concentration ranging from about 20 wt. % to about 70 wt. % of the wear-resistant rubber composition.

According to some embodiments, the present disclosure relates to a wear-resistant rubber composition, wherein at least one polymerization accelerant may be selected from the group consisting of zinc oxide, stearic acid, N-cyclohexyl-2-benzothiazole sulfonamide, tetrabenzyl thiuram disulfide. In some embodiments, at least one hydroxy-terminated polybutadiene may be present at a concentration ranging from about 1 wt. % to about 10 wt. % of the wear-resistant rubber composition. At least one hydroxy-terminated polybutadiene may be present at a concentration of about 2 wt. % of the wear-resistant rubber composition, in some embodiments. At least one polybutadiene may be present at a concentration ranging from about 2 wt. % to about 20 wt. % of the wear-resistant rubber composition, according to some embodiments. In some embodiments, at least one processing additive may be present at a concentration ranging from about 1 wt. % to about 10 wt. % of the wear-resistant rubber composition. In some embodiments, a wear-resistant rubber composition may be used in a wear-resistant lifter bar assembly. A wear-resistant rubber composition may have an effective cross-linking density of at least about $40 \times 10^{-5}$ moles/cm$^3$. According to some embodiments, a wear-resistant rubber composition may have an effective cross-linking density of at least about $60 \times 10^{-5}$ moles/cm$^3$. In some embodiments, a wear-resistant rubber composition may wear from about 10% to about 40% over a period of time, the period of time may be selected from the group consisting of about 1 week, about 3 weeks, about 7 weeks, about 14 weeks, about 21 weeks, and about 24 weeks. In some embodiments, a wear-resistant rubber composition wears at most about 30% over about 24 weeks.

The present disclosure relates, in some embodiments, to a wear-resistant lifter bar assembly comprising at least one rack for fixing the wear resistant lifter bar to a cylindrical wall of a rotating drum of a mill; and at least one wear body comprising a wear resistant rubber composition, wherein the wear resistant rubber composition comprises: at least one hydroxy-terminated polybutadiene; at least one natural rubber; at least one polymerization accelerant; at least one sulfur; and at least one polybutadiene, wherein the wear-resistant rubber composition wherein the wear-resistant rubber composition may have an effective cross-linking density of at least about $30 \times 10^{-5}$ moles/cm$^3$. In some embodiments, a wear resistant rubber composition may comprise: at least one antiozonant; at least one vulcanization inhibitor; at least one silica; at least one processing additive; at least one coupling agent; or combinations thereof. According to some embodiments, a wear resistant rubber composition may comprise: an organosilane additive; at least one peptizer; at least one plasticizer; at least one carbon black; or combinations thereof. At least one natural rubber may be present at a concentration ranging from about 20 wt. % to about 70 wt. % of the wear-resistant rubber composition, according to some embodiments. In some embodiments, at least one polymerization accelerant may be selected from the group consisting of zinc oxide, stearic acid, N-cyclohexyl-2-benzothiazole sulfonamide, tetrabenzyl thiuram disulfide. In some embodiments, at least one hydroxy-terminated polybutadiene may be present at a concentration ranging from about 1 wt. % to about 10 wt. % of the wear-resistant rubber composition. According to some embodiments, at least one hydroxy-terminated polybutadiene may be present at a concentration of about 2 wt. % of the wear-resistant rubber composition. In some embodiments, at least one polybutadiene may be present at a concentration ranging from about 2 wt. % to about 20 wt. % of the wear-resistant rubber composition. At least one processing additive may be present at a concentration ranging from about 1 wt. % to about 10 wt. % of the wear-resistant rubber composition, in some embodiments. A wear-resistant rubber composition may have an effective cross-linking density of at least about $40 \times 10^{-5}$ moles/cm$^3$. A wear-resistant rubber composition may have an effective cross-linking density of at least about $60 \times 10^{-5}$ moles/cm$^3$, according to some embodiments of the disclosure. A wear-resistant rubber composition wears from about 10% to about 40% over a period of time, the period of time selected from the group consisting of about 1 week, about 3 weeks, about 7 weeks, about 14 weeks, about 21 weeks, and about 24 weeks, according to some embodiments. In some embodiments, a wear-resistant rubber composition wears at most about 30% over about 24 weeks.

The present disclosure relates, according to some embodiments, to a wear-resistant rubber composition comprising: at least one hydroxy-terminated polybutadiene; at least one natural rubber; at least one polymerization accelerant; at least one sulfur; and at least one polybutadiene, wherein the wear-resistant rubber composition may have an effective cross-linking density of at least about $30 \times 10^{-5}$ moles/cm$^3$, and wherein the wear-resistant rubber composition wears from about 10% to about 40% over a period of time, the period of time selected from the group consisting of about 1 week, about 3 weeks, about 7 weeks, about 14 weeks, about 21 weeks, and about 24 weeks. In some embodiments, a wear-resistant rubber composition may comprise: at least one antiozonant; at least one vulcanization inhibitor; at least one silica; at least one processing additive; at least one coupling agent; or combinations thereof. According to some embodiments, a wear-resistant rubber composition may comprise: an organosilane additive; at least one peptizer; at least one plasticizer; at least one carbon black; or combinations thereof.

In some embodiments, a wear-resistant rubber composition wears at most about 30% over about 24 weeks. In some embodiments, the present disclosure relates to a wear-resistant rubber composition that may be used in a wear-resistant lifter bar assembly.

The present disclosure relates, according to some embodiments, to a wear-resistant shock absorber assembly comprising: an object with sufficient mass to benefit from shock absorption; and a wear-resistant rubber composition, wherein the wear-resistant rubber composition comprises: at least one hydroxy-terminated polybutadiene; at least one natural rubber; at least one polymerization accelerant; at least one sulfur; and at least one polybutadiene, wherein the wear-resistant rubber composition may have an effective cross-linking density of at least about $30 \times 10^{-5}$ moles/cm$^3$. In some embodiments, a wear-resistant shock absorber assembly may comprise: at least one antiozonant; at least one vulcanization inhibitor; at least one silica; at least one processing additive; at least one coupling agent; or combinations thereof. According to some embodiments, a wear-resistant shock absorber assembly may comprise: an organosilane additive; at least one peptizer; at least one plasticizer; at least one carbon black; or combinations thereof.

In some embodiments, at least one natural rubber may be present at a concentration ranging from about 20 wt. % to about 70 wt. % of the wear-resistant rubber composition. According to some embodiments, at least one polymerization accelerant may be selected from the group consisting of zinc oxide, stearic acid, N-cyclohexyl-2-benzothiazole sulfonamide, tetrabenzyl thiuram disulfide. In some embodiments, a t least one hydroxy-terminated polybutadiene may be present at a concentration ranging from about 1 wt. % to about 10 wt. % of the wear-resistant rubber composition. According to some embodiments, at least one hydroxy-terminated polybutadiene may be present at a concentration of about 2 wt. % of the wear-resistant rubber composition.

In some embodiments, at least one polybutadiene may be present at a concentration ranging from about 2 wt. % to about 20 wt. % of the wear-resistant rubber composition. In some embodiments, at least one processing additive may be present at a concentration ranging from about 1 wt. % to about 10 wt. % of the wear-resistant rubber composition. According to some embodiments, a wear-resistant rubber composition may be used in a wear-resistant lifter bar assembly. According to some embodiments, a wear-resistant rubber composition may have an effective cross-linking density of at least about $40 \times 10^{-5}$ moles/cm$^3$. According to some embodiments, a wear-resistant rubber composition may have an effective cross-linking density of at least about $60 \times 10^{-5}$ moles/cm$^3$. In some embodiments, a wear-resistant rubber composition wears from about 10% to about 40% over a period of time, the period of time selected from the group consisting of about 1 week, about 3 weeks, about 7 weeks, about 14 weeks, about 21 weeks, and about 24 weeks. According to some embodiments, a wear-resistant rubber composition wears at most about 30% over about 24 weeks. In some embodiments, a object with sufficient mass to benefit from shock absorption comprises an automotive engine, a bridge, a building, an automobile, a seismic attenuator, a vibration damping rubber bushing, and a shock absorption.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Some embodiments of the disclosure may be understood by referring, in part, to the present disclosure and the accompanying drawings, wherein:

FIG. 6A illustrates lifter bar wear testing performed over a period of four weeks on lifter bars comprising wear-resistant rubber compositions not containing hydroxy-terminated polybutadiene, according to specific example embodiments of the disclosure; and FIG. 6B illustrates lifter bar wear testing performed on a period of four weeks on lifter bars comprising wear-resistant rubber compositions comprising hydroxy-terminated polybutadiene, according to specific example embodiments of the disclosure.

DETAILED DESCRIPTION

Figure 1:
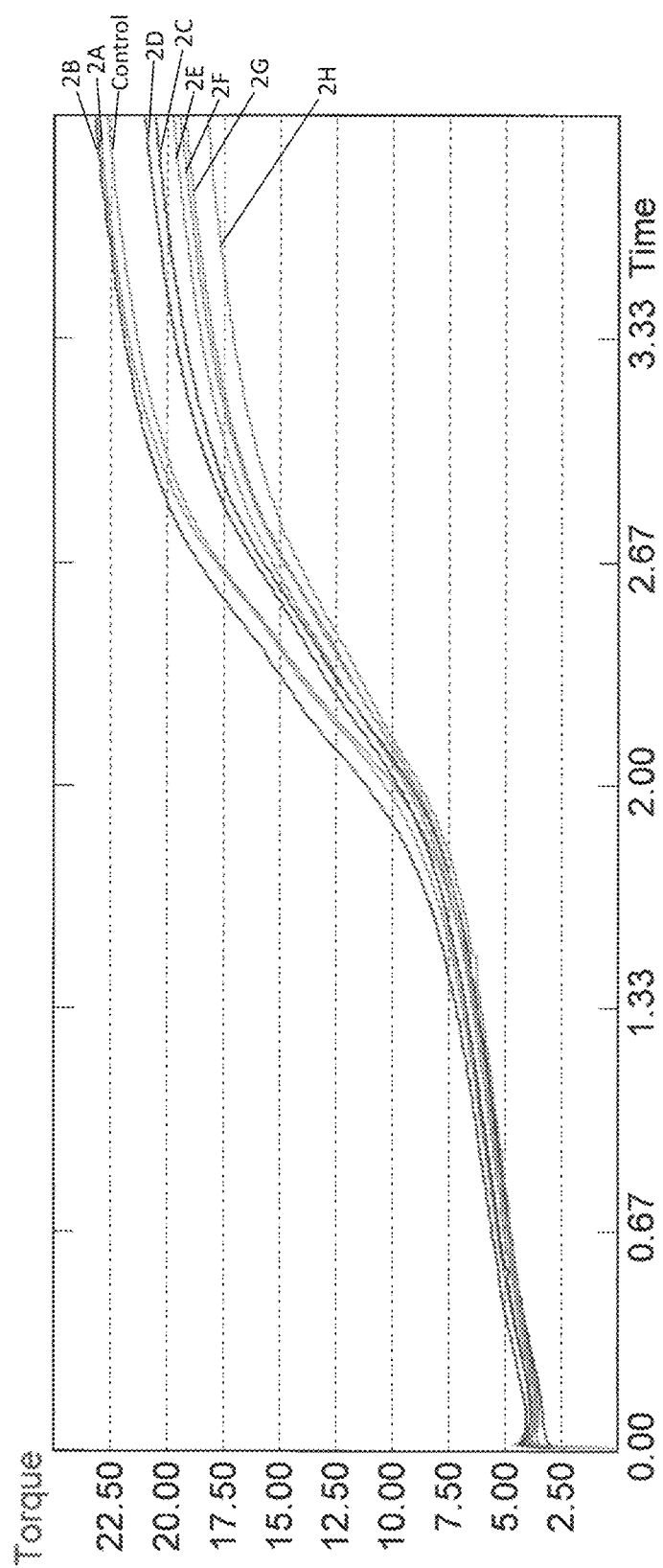
FIG. 1 illustrates differing rheometer data for wear-resistant rubber compositions with varying hydroxy-terminated polybutadiene concentrations, according to specific example embodiments of the disclosure.

The present disclosure relates, in some embodiments, to wear-resistant rubber compositions. In some embodiments, a wear-resistant rubber composition may be used with mining, automotive, and industrial equipment, including, for example, damp shock absorbers and/or lifter bars. In wear-resistant rubber compositions comprising at least one silica, a vacuole and/or empty space may form around the at least one silica. In some embodiments, a vacuole and/or empty space around at least one silica may be formed as a result of a weak filler polarity interaction to a wear-resistant rubber composition matrix. According to some embodiments, wear-resistant rubber compositions may comprise at least one silane, wherein the presence of at least one silane may result in strong filler to wear-resistant rubber composition matrix bonding. In some embodiments, wear-resistant rubber compositions comprising at least one hydroxy-terminated polybutadiene (e.g., Poly Bd R20LM) may advantageously have a strong bond between the filler and other components of a wear-resistant rubber composition matrix. A hydroxy-terminated polybutadiene may improve filler interaction with the wear-resistant rubber composition matrix. In some embodiments, wear-resistant rubber compositions comprising at least one hydroxy-terminated polybutadiene may prevent vacuole formation in compositions comprising at least one silica, wherein said composition would readily form vacuoles in the absence of the at least one hydroxy-terminated polybutadiene.

According to some embodiments, compositions comprising reinforcing fillers (e.g., silica) may also have an increased dynamic modulus of rubber. Contribution of a filler to a dynamic modulus of rubber may comprise strain-dependent modulus and strain independent modulus. In some embodiments, a filler-filler interaction may contribute to a strain dependent modulus, wherein increasing strain may decrease modulus. In some embodiments, a Payne effect may be due to a partial reverse breakdown of filler-filler interactions within a filler network.

In some embodiments, wear-resistant rubber compositions comprising at least one hydroxy-terminated polybutadiene (e.g., Poly Bd R20LM), may comprise advantageous wear resistance. In some embodiments, wear-resistant rubber compositions comprising at least one hydroxy-terminated polybutadiene may have a low Payne-effect. According to some embodiments, wear-resistant rubber compositions comprising at least one hydroxy-terminated polybutadiene may have lower filler-filler interactions (i.e., Payne effects) in comparison to wear-resistant rubber compositions not containing at least one hydroxy-terminated polybutadiene. In some embodiments, having a low Payne-effect may allow wear-resistant rubber compositions to have advantageous wear resistance while also advantageously meeting processing requirements necessary to accommodate the needs for industries comprising mining, oil and gas, automotive, and construction.

In some embodiments, a wear-resistant rubber composition may be advantageously resistant to wear, wear comprising a resistance to degradation and/or erosion in the presence of at least one stress, the at least one stress comprising abrasion, high temperatures (e.g., at least about 500° F.), low temperatures (e.g., at most about −40° F.), temperature fluctuations, high pressures (e.g., at least about 10000 psi), low pressures (e.g., at most about $1\times10^{-5}$ psi), pressure fluctuations, impact, or combinations thereof. According to some embodiments, wear resistance may comprise a resistance to degradation and/or erosion that may be caused through an interaction of a wear-resistant rubber composition and an adjacent surface of another body, wherein another body (e.g., a load) may comprise a solid, liquid, or gas. A wear-resistant rubber composition may be resistant to wear that may be caused by at least one load, the at least one load comprising an impact load, a unidirectional sliding load, a multi-directional sliding load, a rolling load, or combination thereof. In some embodiments, a wear-resistant rubber composition may resist wear comprising fretting wear (i.e., repeated cyclical contacting between two surfaces), erosive wear, oxidation wear, corrosion wear, or combinations thereof.

Wear-Resistant Rubber Compositions

In some embodiments, a wear-resistant rubber composition may comprise an elastomer, such as a thermoset elastomer capable of withstanding wear. As used herein, for example, an elastomer may comprise: natural rubber (NR), polyurethane, butadiene acrylonitrile copolymer, nitrile rubber, liquid polybutadiene (Liquid PBD), NBR, hydrogenated nitrile rubber, hydrogenated NBR, highly saturated nitrile, HNR, HNBR, carboxylated NBR (XNBR), chloroprene rubber (CR), ethylene propylene diene terpolymer (EPDM), acrylic rubber (ACM), styrene-butadiene rubber (SBRS, polybutadiene/butadiene rubber (BR), low acrylonitrile nitrile (a low ACN nitrile), synthetic polyisoprene, butyl rubbers (IIR), chlorosulphonated polyethylene (CSM), silicone, fluoro rubbers, perfluoro rubbers, tetrafluoro ethylene propylene rubber (FEPM), and combinations thereof.

According to some embodiments, a wear-resistant rubber composition may comprise at least one natural rubber (e.g., polyisoprene). In some embodiments, a wear-resistant rubber composition may comprise an at least one natural rubber content of about 10 wt. %, or about 15 wt. %, or about 20 wt. %, or about 25 wt. %, or about 30 wt. %, or about 35 wt. %, or about 40 wt. %, or about 50 wt. %, or about 55 wt. %, or about 60 wt. % of the wear-resistant rubber composition. In some embodiments, "about," as used in the preceding sentence, includes plus or minus 5 wt. %. In some embodiments, a wear-resistant rubber composition may comprise about 5 parts per hundred rubber (Phr) of at least one natural rubber, or about 20 Phr of at least one natural rubber, or about 25 Phr of at least one natural rubber, or about 30 Phr of at least one natural rubber, or about 35 Phr of at least one natural rubber, or about 40 Phr of at least one natural rubber, or about 45 Phr of at least one natural rubber, or about 50 Phr of at least one natural rubber, or at least about 60 Phr of at least one natural rubber, or at least about 65 Phr of at least one natural rubber, or at least about 70 Phr of at least one natural rubber, or at least about 75 Phr of at least one natural rubber, or at least about 80 Phr of at least one natural rubber, or at least about 85 Phr of at least one natural rubber, or at least about 90 Phr of at least one natural rubber. In some embodiments, "about," as used in the preceding sentence, includes plus or minus 5 Phr. In some embodiments, at least one natural rubber may comprise, cis-1,4-polyisoprene, trans-1,4-polyisoprene, or combinations thereof. In some embodiments, an addition of at least one natural rubber may advantageously provide resilience, enhanced dynamic properties with a low hysteresis loss, and/or good low temperature properties. According to some embodiments, at least one natural rubber may comprise a cross-linking agent. In some embodiments, at least one natural rubber may comprise a cross-linking agent content of about 1 Phr to about 20 Phr.

In some embodiments, a wear-resistant rubber composition may comprise at least one hydroxy-terminated polybutadiene (e.g., Poly BD R20LM, Poly BD R-45HTLO). According to some embodiments, a wear-resistant rubber composition may comprise an at least one hydroxy-terminated polybutadiene content of about 1 wt. %, or about 2 wt. %, or about 4 wt. %, or about 6 wt. %, or about 8 wt. %, or about 10 wt. %, or about 12 wt. %, or about 14 wt. %, or about 16 wt. %, or about 18 wt. %, or about 20 wt. % of the wear-resistant rubber composition. In some embodiments, "about," as used in the preceding sentence, includes plus or minus 1 wt. %. In some embodiments, a wear-resistant rubber composition may comprise about 1 Phr of at least one hydroxy-terminated polybutadiene, or about 2 Phr of at least one hydroxy-terminated polybutadiene, or about 3 Phr of at least one hydroxy-terminated polybutadiene, or about 4 Phr of at least one hydroxy-terminated polybutadiene, or about 5 Phr of at least one hydroxy-terminated polybutadiene, or about 6 Phr of at least one hydroxy-terminated polybutadiene, or about 6 Phr of at least one hydroxy-terminated polybutadiene, or about 7 Phr of at least one hydroxy-terminated polybutadiene, or about 8 Phr of at least one hydroxy-terminated polybutadiene, or about 9 Phr of at least one hydroxy-terminated polybutadiene, or about 10 Phr of at least one hydroxy-terminated polybutadiene. In some embodiments, "about," as used in the preceding sentence, includes plus or minus 2.5 Phr.

According to some embodiments, a wear-resistant composition comprising at least one hydroxy-terminated polybutadiene may advantageously meet processing requirements necessary to accommodate the needs for industries comprising mining, oil and gas, automotive, and construction. In some embodiments, processing may comprise curing, fabricating, extruding, calendaring, cutting, mixing, balancing, rolling, milling, granulating, shredding, squeezing, pelleting, packaging, drying, vulcanizing, tumbling, compounding, cleansing, coating, or combination thereof. In some embodiments, a wear-resistant composition comprising at least one hydroxy-terminated polybutadiene may have a lower Payne effect in comparison to a wear-resistant composition not containing at least one hydroxy-terminated polybutadiene. According to some embodiments, a wear-resistant rubber composition comprising at least one hydroxy-terminated polybutadiene may have a reduced deformation-induced change in a wear-resistant rubber composition microstructure in comparison to a wear-resistant rubber composition not containing at least hydroxy-terminated polybutadiene. In some embodiments, deformation-induced change in a wear-resistant rubber composition microstructure may cause frequency and/or amplitude dependent stiffening of the wear-resistant rubber composition.

According to some embodiments, a Payne effect may be attributed to deformation-inducing changes and/or a breaking of at least one microstructure within a wear-resistant rubber composition, which may be due to weak physical bond linking of an adjacent filler. In some embodiments, a filler may comprise at least one silica, at least one silane, or combinations thereof. In some embodiments, increasing an amount of at least one filler may increase a Payne effect within a wear-resistant rubber composition. In some embodiments, an addition of at least one hydroxy-terminated polybutadiene to a wear-resistant rubber composition may advantageously build a robust linking process between the wear-resistant rubber composition and at least one filler. An addition of at least one hydroxy-terminated polybutadiene to a wear-resistant rubber composition may reduce a Payne effect of the wear-resistant rubber composition. In some embodiments, a robust linking process between a wear-resistant rubber composition and at least one filler may reduce interactions between the wear-resistant rubber composition and at least one filler, which may result in reducing a Payne effect in the wear-resistant rubber composition. In some embodiments, reducing a Payne effect in a wear-resistant rubber composition may increase a relative thermal stability of the wear-resistant rubber composition, may increase relative abrasion resistance of the wear-resistant rubber composition, or combinations thereof. For example, a lifter bar and/or a mill liner comprising at least one wear-resistant rubber composition with a reduced Payne effect may have a relative increased useful tread life and/or consistent performance, according to some embodiments of the disclosure. In some embodiments, a wear-resistant rubber composition with a reduced Payne effect may be used to fabricate products with an increased abrasion resistance, the products comprising lifter bars, screen media, swellable packers, and mill liners.

In some embodiments a wear-resistant rubber composition comprising at least one hydroxy-terminated polybutadiene may further comprise a higher density of cross-linking (i.e., degree of cross-linking) in comparison to a wear-resistant rubber composition that does not comprise at least one hydroxy-terminated polybutadiene. According to some embodiments, a wear-resistant rubber composition may comprise an effective cross-linking density ($v_e$) from about 30 to about $80 \times 10^{-5}$ moles/cm$^3$. In some embodiments, a wear-resistant rubber composition may comprise an effective cross-linking density of about $30 \times 10^{-5}$ moles/cm$^3$, or of about $35 \times 10^{-5}$ moles/cm$^3$, $40 \times 10^{-5}$ moles/cm$^3$, or of about $45 \times 10^{-5}$ moles/cm$^3$, or of about $50 \times 10^{-5}$ moles/cm$^3$, or of about $55 \times 10^{-5}$ moles/cm$^3$, or of about $60 \times 10^{-5}$ moles/cm$^3$, or of about $65 \times 10^{-5}$ moles/cm$^3$, or of about $70 \times 10^{-5}$ moles/cm$^3$, or of about $75 \times 10^{-5}$ moles/cm$^3$, or of about $80 \times 10^{-5}$ moles/cm$^3$. In some embodiments, "about," as used in the preceding sentence, includes plus or minus $5 \times 10^{-5}$ moles/cm$^3$. For example, a wear-resistant rubber composition may comprise an effective cross-linking density of ≥about $30 \times 10^{-5}$ moles/cm$^3$, or ≥about $35 \times 10^{-5}$ moles/cm$^3$, or ≥about $40 \times 10^{-5}$ moles/cm$^3$, or ≥about $45 \times 10^{-5}$ moles/cm$^3$, or ≥about $50 \times 10^{-5}$ moles/cm$^3$, or ≥about $55 \times 10^{-5}$ moles/cm$^3$, or ≥about $60 \times 10^{-5}$ moles/cm$^3$, or ≥about $65 \times 10^{-5}$ moles/cm$^3$, or ≥about $70 \times 10^{-5}$ moles/cm$^3$, or ≥about $75 \times 10^{-5}$ moles/cm$^3$, or ≥about $80 \times 10^{-5}$ moles/cm$^3$. In some embodiments, "about," as used in the preceding sentence, includes plus or minus $5 \times 10^{-5}$ moles/cm$^3$, according to some embodiments.

According to some embodiments, a wear-resistant rubber composition may comprise at least one silica (e.g., Hisil 190G-Silica) content of about 5 wt. %, of about 10 wt. %, or of about 15 wt. %, or of about 20 wt. %, or of about 25 wt. %, or of about 30 wt. %, or of about 35 wt. %, or of about 40 wt. % of the wear-resistant rubber composition. In some embodiments, "about," as used in the preceding sentence, includes plus or minus 5 wt. %. In some embodiments, a wear-resistant rubber composition may comprise about 40 Phr of at least one silica, or about 45 Phr of at least one silica, or about 50 Phr of at least one silica, or about 55 Phr of at least one silica, or about 60 Phr of at least one silica, or about 65 Phr of at least one silica, or about 70 Phr of at least one silica. In some embodiments, "about," as used in the preceding sentence, includes plus or minus 0.2 Phr. In some embodiments, the addition of at least one silica may advantageously contribute to preventing based wear resistance and may reinforce a wear-resistant rubber composition. In some embodiments, at least one silica may comprise a high surface area silica.

According to some embodiments, a wear-resistant rubber composition may comprise at least one polybutadiene (e.g., high cis polybutadiene rubber, low cis polybutadiene rubber). In some embodiments, a wear-resistant rubber composition may comprise an at least one polybutadiene content of about 1 wt. %, or about 2 wt. %, or about 4 wt. %, or about 6 wt. %, or about 8 wt. %, or about 10 wt. %, or about 12 wt. %, or about 14 wt. %, or about 16 wt. %, or about 18 wt. %, or about 20 wt. % of the wear-resistant rubber composition. In some embodiments, "about," as used in the preceding sentence, includes plus or minus 1 wt. %. In some embodiments, a wear-resistant rubber composition may comprise about 1 Phr of at least one polybutadiene, or about 5 Phr of at least one polybutadiene, or about 10 Phr of at least one polybutadiene, or about 15 Phr of at least one polybutadiene, or about 20 Phr of at least one polybutadiene, or about 25 Phr of at least one polybutadiene, or about 30 Phr of at least one polybutadiene, or about 35 Phr of at least one polybutadiene, or about 40 Phr of at least one polybutadiene, or about 45 Phr of at least one polybutadiene. In some embodiments, "about," as used in the preceding sentence, includes plus or minus 5 Phr. In some embodiments, a high cis polybutadiene may be characterized by a high proportion of cis (e.g., at least about 90% cis). In some embodiments, a low cis polybutadiene may be characterized by low proportion of cis (e.g., at most about 40% cis). In some embodiments, at least one polybutadiene may comprise a high vinyl polybutadiene (e.g., at least about 70% vinyl). In some embodiments, adding at least one polybutadiene to a wear-resistant rubber composition may improve mechanical strength, stability, and/or may contribute to wear-resistance. According to some embodiments, at least one polybutadiene may comprise at least one hydrolyzed HLT polybutadiene.

In some embodiments, a wear-resistant rubber composition may also comprise a cement, a Portland cement, and one or more reactive filler materials, such as cement, cementations material, metal oxide, and mixtures thereof, which react and swell upon contact with water. In some embodiments, a wear-resistant rubber composition may stiffen upon contact with water. In some embodiments, a cement may result in improvements in the physical properties of the rubber, such as increased volume and increased modulus. For example, a filler may be a reactive filler, a reinforcing reactive filler, a sealing system, a cement clinker, a silicate, a aluminate, a ferrite and/or combinations thereof.

According to some embodiments, a wear-resistant rubber composition may comprise at least one peptizer (e.g., zinc stearate, Struktol A60). In some embodiments, a wear-resistant rubber composition may comprise at least one peptizer content of about 0.1 wt. %, or about 0.2 wt. %, or about 0.3 wt. %, or about 0.4 wt. %, or about 0.5 wt. %, or about 0.6 wt. %, or about 0.7 wt. %, or about 0.8 wt. %, or about 0.9 wt. %, or about 1.0 wt. %, or about 1.25 wt. %, or about 1.5 wt. % of the wear-resistant rubber composition. In some embodiments, "about," as used in the preceding sentence, includes plus or minus 0.1 wt. %. In some embodiments, a wear-resistant rubber composition may comprise about 5 Phr of at least one peptizer, or about 0.4 Phr of at least one peptizer, or about 0.6 Phr of at least one peptizer, or about 0.8 Phr of at least one peptizer, or about 1.0 Phr of at least one peptizer, or about 1.2 Phr of at least one peptizer, or about 1.4 Phr of at least one peptizer, or about 1.6 Phr of at least one peptizer, or about 1.8 Phr of at least one peptizer, or about 2 Phr, or about 2.2 Phr, or about 2.4 Phr, or about 2.6 Phr, or about 2.8 Phr, or about 3.0 Phr of at least one peptizer. In some embodiments, "about," as used in the preceding sentence, includes plus or minus 0.2 Phr. In some embodiments, at least one peptizer may comprise at least one physical peptizer, at least chemical peptizer, or combinations thereof. According to some embodiments, a peptizer may facilitate filler incorporation, facilitate dispersion of compounding materials, improve elastomer blends, reduce processing temperatures, improve flow properties, enhance building tack, or combinations thereof.

In some embodiments, a wear-resistant rubber composition may comprise at least one coupling agent (e.g., Bis[3-(triethoxysilyl)propyl] tetrasulfide, SI-69, 1-Methoxy-2-propoxy silane, methyltriethoxy silane). In some embodiments, a wear-resistant rubber composition may comprise an at least one coupling agent content of about 1 wt. %, or about 2 wt. %, or about 4 wt. %, or about 6 wt. %, or about 8 wt. %, or about 10 wt. %, or about 12 wt. %, or about 14 wt. %, or about 16 wt. %, or about 18 wt. %, or about 20 wt. % of the wear-resistant rubber composition. In some embodiments, "about," as used in the preceding sentence, includes plus or minus 1 wt. %. In some embodiments, a wear-resistant rubber composition may comprise about 1 Phr of at least one coupling agent, or about 2 Phr of at least one coupling agent, or about 2 Phr of at least one coupling agent, or about 4 Phr of at least one coupling agent, or about 6 Phr of at least one coupling agent, or about 8 Phr of at least one coupling agent, or about 10 Phr of at least one coupling agent, or about 12 Phr of at least one coupling agent, or about 14 Phr of at least one coupling agent, or about 16 Phr of at least one coupling agent, or about 18 Phr of at least one coupling agent, or about 20 Phr of at least one coupling agent. In some embodiments, "about," as used in the preceding sentence, includes plus or minus 2.5 Phr. According to some embodiments, at least one coupling agent may comprise bis (triethoxyl propyl) tetrasulfide (TESPT). In some embodiments, inclusion of at least one coupling agent may provide higher compound modulus, lower hysteresis, improved compression set, and may contribute to wear-resistance. Inclusion of at least one coupling agent may increase bonding between a silica and at least one wear-resistant rubber composition, which may contribute to wear-resistant properties.

In some embodiments, a wear-resistant rubber composition may also comprise at least one antiozonant (e.g., Luxco 2085, N-(1,3-Dimethylbutyl)-N'-phenyl-phenylenediamine (Santoflex 6PPD)). In some embodiments, an antiozonant may comprise phenylenediamines (e.g., N-(1,3-Dimethylbutyl)-N'-phenyl-phenylenediamine), diureas (e.g., ethylene diurea), and paraffin waxes. In some embodiments, a wear-resistant rubber composition may comprise an at least one antiozonant content of about 0.1 wt. %, or about 0.2 wt. %, or about 0.4 wt. %, or about 0.6 wt. %, or about 0.8 wt. %, or about 1.0 wt. %, or about 1.2 wt. %, or about 1.4 wt. %, or about 1.6 wt. %, or about 1.8 wt. %, or about 2.0 wt. % of the wear-resistant rubber composition. In some embodiments, "about," as used in the preceding sentence, includes plus or minus 0.1 wt. %. In some embodiments, a wear-resistant rubber composition may comprise about 1 Phr of at least one antiozonant, or about 2 Phr of at least one antiozonant, or about 2 Phr of at least one antiozonant, or about 4 Phr of at least one antiozonant, or about 6 Phr of at least one antiozonant, or about 8 Phr of at least one antiozonant, or about 10 Phr of at least one antiozonant, or about 12 Phr of at least one antiozonant. In some embodiments, "about," as used in the preceding sentence, includes plus or minus 1 Phr. According to some embodiments, an antiozonant may protect the wear-resistant rubber composition and from ozone.

In some embodiments, a wear-resistant rubber composition may comprise at least one plasticizer (e.g., Tarene 30) for rubber products, such as phthalate esters (e.g., dioctyl phthalate), trimellitates, sebacates, adipates, terephthalates, benzoates, dibenzoates, organophosphates, gluterates, or azelates. In some embodiments, a wear-resistant rubber composition may comprise an at least one plasticizer content of about 0.1 wt. %, or about 0.2 wt. %, or about 0.4 wt. %, or about 0.6 wt. %, or about 0.8 wt. %, or about 1.0 wt. %, or about 1.2 wt. %, or about 1.4 wt. %, or about 1.6 wt. %, or about 1.8 wt. %, or about 2.0 wt. % of the wear-resistant rubber composition. In some embodiments, "about," as used in the preceding sentence, includes plus or minus 0.1 wt. %. In some embodiments, a wear-resistant rubber composition may comprise about 1 Phr of at least one plasticizer, or about 2 Phr of at least one plasticizer, or about 2 Phr of at least one plasticizer, or about 4 Phr of at least one plasticizer, or about 6 Phr of at least one plasticizer, or about 8 Phr of at least one plasticizer, or about 10 Phr of at least one plasticizer, or about 12 Phr of at least one plasticizer. In some embodiments, "about," as used in the preceding sentence, includes plus or minus 1 Phr. In some embodiments, a plasticizer may improve overall flexibility, low temperature properties and high temperature aging stability of a wear-resistant rubber composition.

In some embodiments, a wear-resistant rubber composition may comprise a material to reinforce a rubber compound to improve physical properties and/or color the product, such as pigments or carbon black (e.g., N-550, N326). According to some embodiments, a wear-resistant rubber composition may comprise a carbon black (e.g., Carbon black N234 ISAF HS, N326 Black) content of about 0.1 wt. %, or about 0.2 wt. %, or about 0.4 wt. %, or about 0.6 wt. %, or about 0.8 wt. %, or about 1.0 wt. %, or about 1.2 wt. %, or about 1.4 wt. %, or about 1.6 wt. %, or about 1.8 wt. %, or about 2.0 wt. % of the wear-resistant rubber composition. In some embodiments, "about," as used in the preceding sentence, includes plus or minus 0.1 wt. %. In some embodiments, a wear-resistant rubber composition may comprise about 1 Phr of at least one carbon black, or about 2 Phr of at least one carbon black, or about 2 Phr of at least one carbon black, or about 4 Phr of at least one carbon black, or about 6 Phr of at least one carbon black, or about 8 Phr of at least one carbon black, or about 10 Phr of at least one carbon black, or about 12 Phr of at least one carbon black. In some embodiments, "about," as used in the preceding sentence, includes plus or minus 1 Phr.

In some embodiments, a wear-resistant rubber composition may comprise at least one vulcanization inhibitor. In some embodiments, a vulcanization inhibitor may comprise a phthalimide (e.g., cyclohexylthiophthalimide), diureas (e.g., ethylene diurea), and paraffin waxes. According to some embodiments, a wear-resistant rubber composition may comprise an at least one vulcanization inhibitor content of about 0.1 wt. %, or about 0.2 wt. %, or about 0.4 wt. %, or about 0.6 wt. %, or about 0.8 wt. %, or about 1.0 wt. %, or about 1.2 wt. %, or about 1.4 wt. %, or about 1.6 wt. %, or about 1.8 wt. %, or about 2.0 wt. % of the wear-resistant rubber composition. In some embodiments, "about," as used in the preceding sentence, includes plus or minus 0.1 wt. %. In some embodiments, a wear-resistant rubber composition may comprise about 1 Phr of at least one vulcanization inhibitor, or about 2 Phr of at least one vulcanization inhibitor, or about 2 Phr of at least one vulcanization inhibitor, or about 4 Phr of at least one vulcanization inhibitor, or about 6 Phr of at least one vulcanization inhibitor, or about 8 Phr of at least one vulcanization inhibitor, or about 10 Phr of at least one vulcanization inhibitor, or about 12 Phr of at least one vulcanization inhibitor. In some embodiments, "about," as used in the preceding sentence, includes plus or minus 1 Phr. In some embodiments, at least one vulcanization inhibitor may prevent scorch and prevent premature vulcanization in a wear-resistant rubber composition. In some embodiments, at least one vulcanization inhibitor may comprise N-(cyclohexylthio) phthalimide (CTP crystals).

According to some embodiments, a wear-resistant rubber composition may comprise at least one polymerization accelerant, the at least one polymerization accelerant comprising stearic acid, N-cyclohexyl-2-benzothiazole sulfonamide (CBS), tetrabenzyl thiuram disulfide (TBzTd), zinc oxide, or combinations thereof. According to some embodiments, a wear-resistant rubber composition may comprise an at least one polymerization accelerant content of about 0.1 wt. %, or about 0.2 wt. %, or about 0.4 wt. %, or about 0.6 wt. %, or about 0.8 wt. %, or about 1.0 wt. %, or about 1.2 wt. %, or about 1.4 wt. %, or about 1.6 wt. %, or about 1.8 wt. %, or about 2 wt. %, or about 4 wt. %, or about 5 wt. %, or about 6 wt. %, or about 8 wt. %, or about 10 wt. % of the wear-resistant rubber composition. In some embodiments, "about," as used in the preceding sentence, includes plus or minus 0.1 wt. %. In some embodiments, a wear-resistant rubber composition may comprise about 1 Phr of at least one polymerization accelerant, or about 2 Phr of at least one polymerization accelerant, or about 2 Phr of at least one polymerization accelerant, or about 4 Phr of at least one polymerization accelerant, or about 6 Phr of at least one polymerization accelerant, or about 8 Phr of at least one polymerization accelerant, or about 10 Phr of at least one polymerization accelerant, or about 12 Phr of at least one polymerization accelerant. In some embodiments, "about," as used in the preceding sentence, includes plus or minus 1 Phr. In some embodiments, polymerization accelerants may increase the rate of polymerization in a wear-resistant rubber composition.

According to some embodiments, a wear-resistant rubber composition may comprise at least one sulfur (e.g., Sulfur RM). According to some embodiments, a wear-resistant rubber composition may comprise an at least one sulfur at a content of about 0.1 wt. %, of about 0.2 wt. %, or of about 0.3 wt. %, or of about 0.4 wt. %, or of about 0.6 wt. %, or of about 0.8 wt. %, or of about 1.0 wt. %, or of about 1.2 wt. %, or of about 1.4 wt. %, or of about 1.6 wt. %, or of about 1.8 wt. %, or of about 2 wt. %, or of about 3 wt. %, or of about 5 wt. %, or of about 10 wt. % of the wear-resistant rubber composition. In some embodiments, "about," as used in the preceding sentence, includes plus or minus 0.25 wt. %. In some embodiments, a wear-resistant rubber composition may comprise about 0.8 parts per hundred rubber (Phr) of at least one sulfur, or about 1.0 Phr of at least one sulfur, or about 1.2 Phr of at least one sulfur, or about 1.4 Phr of at least one sulfur, or about 1.6 Phr of at least one sulfur, or about 1.8 Phr of at least one sulfur, or about 2.0 Phr of at least one sulfur, or about 2.2 Phr of at least one sulfur, or about 2.4 Phr of at least one sulfur, or about 2.6 Phr of at least one sulfur, or about 2.8 Phr of at least one sulfur, or about 3.0 Phr of at least one sulfur, or about 3.5 Phr of at least one sulfur, or about 4.0 Phr of at least one sulfur. In some embodiments, "about," as used in the preceding sentence, includes plus or minus 0.2 Phr.

In some embodiments, a wear-resistant rubber composition may comprise at least one processing additive (e.g., Struktol HT 207, lard, $C_8$-$C_{29}$ fatty acids, straight chained fatty acids, branched chain fatty acids). In some embodiments, a wear-resistant rubber composition may comprise at least one processing additive at a content of about 0.1 wt. %, of about 0.2 wt. %, or of about 0.3 wt. %, or of about 0.4 wt. %, or of about 0.6 wt. %, or of about 0.8 wt. %, or of about 1.0 wt. %, or of about 1.2 wt. %, or of about 1.4 wt. %, or of about 1.6 wt. %, or of about 1.8 wt. %, or of about 2 wt. %, or of about 3 wt. %, or of about 5 wt. %, or of about 10 wt. % of the wear-resistant rubber composition. In some embodiments, "about," as used in the preceding sentence, includes plus or minus 0.25 wt. %. In some embodiments, a wear-resistant rubber composition may comprise about 0.8 parts per hundred rubber (Phr) of at least one sulfur, or about 1.0 Phr of at least one sulfur, or about 1.2 Phr of at least one sulfur, or about 1.4 Phr of at least one sulfur, or about 1.6 Phr of at least one sulfur, or about 1.8 Phr of at least one sulfur, or about 2.0 Phr of at least one sulfur, or about 2.2 Phr of at least one sulfur, or about 2.4 Phr of at least one sulfur, or about 2.6 Phr of at least one sulfur, or about 2.8 Phr of at least one sulfur, or about 3.0 Phr of at least one sulfur, or about 3.5 Phr of at least one sulfur, or about 4.0 Phr of at least one sulfur. In some embodiments, "about," as used in the preceding sentence, includes plus or minus 0.2 Phr. In some embodiments, a processing additive may promote composition dispersion and reduce agglomeration.

In some embodiments, a wear-resistant rubber composition may comprise at least one antioxidant (e.g., methyl methacrylate butadiene styrene). According to some embodiments, a wear-resistant rubber composition may comprise an at least one antioxidant at a content of about 0.1 wt. %, of about 0.2 wt. %, or of about 0.3 wt. %, or of about 0.4 wt. %, or of about 0.6 wt. %, or of about 0.8 wt. %, or of about 1.0 wt. %, or of about 1.2 wt. %, or of about 1.4 wt. %, or of about 1.6 wt. %, or of about 1.8 wt. %, or of about 2 wt. %, or of about 3 wt. %, or of about 5 wt. %, or of about 10 wt. % of the wear-resistant rubber composition. In some embodiments, "about," as used in the preceding sentence, includes plus or minus 0.25 wt. %. In some embodiments, a wear-resistant rubber composition may comprise about 0.8 parts per hundred rubber (Phr) of at least one antioxidant, or about 1.0 Phr of at least one antioxidant, or about 1.2 Phr of at least one antioxidant, or about 1.4 Phr of at least one antioxidant, or about 1.6 Phr of at least one antioxidant, or about 1.8 Phr of at least one antioxidant, or about 2.0 Phr of at least one antioxidant, or about 2.2 Phr of at least one antioxidant, or about 2.4 Phr of at least one antioxidant, or about 2.6 Phr of at least one antioxidant, or about 2.8 Phr of at least one antioxidant, or about 3.0 Phr of at least one antioxidant, or about 3.5 Phr of at least one antioxidant, or about 4.0 Phr of at least one antioxidant. In some embodiments, "about," as used in the preceding sentence, includes plus or minus 0.2 Phr. In some embodiments, at least one antioxidant may protect a wear-resistant rubber composition from degradation caused by oxygen.

In some embodiments, a wear-resistant rubber composition may comprise at least one antidegradant (e.g., 2,2,4-Trimethyl-1,2-dihydroquinoline (TMQ)). According to some embodiments, a wear-resistant rubber composition may comprise an at least one antidegradant at a content of about 0.1 wt. %, of about 0.2 wt. %, or of about 0.3 wt. %, or of about 0.4 wt. %, or of about 0.6 wt. %, or of about 0.8 wt. %, or of about 1.0 wt. %, or of about 1.2 wt. %, or of about 1.4 wt. %, or of about 1.6 wt. %, or of about 1.8 wt. %, or of about 2 wt. %, or of about 3 wt. %, or of about 5 wt. %, or of about 10 wt. % of the wear-resistant rubber composition. In some embodiments, "about," as used in the preceding sentence, includes plus or minus 0.25 wt. %. In some embodiments, a wear-resistant rubber composition may comprise about 0.8 parts per hundred rubber (Phr) of at least one antidegradant, or about 1.0 Phr of at least one antidegradant, or about 1.2 Phr of at least one antidegradant, or about 1.4 Phr of at least one antidegradant, or about 1.6 Phr of at least one antidegradant, or about 1.8 Phr of at least one antidegradant, or about 2.0 Phr of at least one antidegradant, or about 2.2 Phr of at least one antidegradant, or about 2.4 Phr of at least one antidegradant, or about 2.6 Phr of at least one antidegradant, or about 2.8 Phr of at least one antidegradant, or about 3.0 Phr of at least one antidegradant, or about 3.5 Phr of at least one antidegradant, or about 4.0 Phr of at least one antidegradant. In some embodiments, "about," as used in the preceding sentence, includes plus or minus 0.2 Phr. In some embodiments, at least one antidegradant may protect a wear-resistant rubber composition from degradation caused by factors, the factors comprising heat, oxygen, light, and humidity.

According to some embodiments, a wear-resistant rubber composition may comprise a hydrogenated nitrile butadiene rubber (e.g., HNBR Zetpol 2030L, Therban 3496) content of about 0.5 wt. %, of about 1 wt. %, or of about 2 wt. %, or of about 3 wt. %, or of about 4 wt. %, or of about 5 wt. %, or of about 6 wt. %, or of about 7 wt. %, or of about 8 wt. %, or of about 9 wt. %, or of about 10 wt. %, or of about 15 wt. % of the wear-resistant rubber composition. In some embodiments, "about," as used in the preceding sentence, includes plus or minus 2 wt. %.

According to some embodiments, a wear-resistant rubber composition may comprise a styrene-butadiene rubber (e.g., 1502 SBR) content of about 5 wt. %, of about 10 wt. %, or of about 15 wt. %, or of about 20 wt. %, or of about 25 wt. %, or of about 30 wt. %, or of about 35 wt. %, or of about 40 wt. %, or of about 45 wt. % of the wear-resistant rubber composition. In some embodiments, "about," as used in the preceding sentence, includes plus or minus 5 wt. %.

According to some embodiments, a wear-resistant rubber composition may comprise a low ACN nitrile (e.g., Perbunan 1846 F) content of about 5 wt. %, of about 10 wt. %, or of about 15 wt. %, or of about 20 wt. %, or of about 25 wt. %, or of about 30 wt. %, or of about 35 wt. %, or of about 40 wt. %, or of about 45 wt. % of the wear-resistant rubber composition. In some embodiments, "about," as used in the preceding sentence, includes plus or minus 5 wt. %.

In some embodiments, a wear-resistant rubber composition may also comprise at least one tackifier. In some embodiments, a tackifier may comprise resins (i.e., hydrocarbon resins, phenolic-formaldehyde resin, coumarone-indene resin, and Struktol Koresin). According to some embodiments, a tackifier may result in an increase of tack (e.g., stickiness of the surface). According to some embodiments, a wear-resistant rubber composition may comprise at least one tackifier (e.g., Struktol Koresin) in a content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. % of the wear-resistant rubber composition. In some embodiments, "about," as used in the preceding sentence, includes plus or minus 0.25 wt. %.

In some embodiments, a wear-resistant rubber composition may also comprise a vulcanization accelerant. In some embodiments, a vulcanization accelerant may comprise aldehyde amines, guanidines, thiazoles, thiophosphates, sulfonamides, thioureas, thiuram, dithiocarbamates, xanthanes. In some embodiments, a vulcanization accelerant may comprise tetramethyl thiuram disulfide, mercaptobenzthiazole disulfide, tetramethyl thiuram monosulfide, dipentamethylene thiuram, zinc chloride, tetrabenzylthiuram disulfide, or combinations thereof. According to some embodiments, a tackifier may result in an increase of vulcanization speed and may permit vulcanization to progress at lower temperatures.

According to some embodiments, a wear-resistant rubber composition may comprise a vulcanization accelerant (e.g., MBTS, Thanecure ZM) content of about 0.8 wt. %, of about 1.0 wt. %, or of about 1.2 wt. %, or of about 1.4 wt. %, or of about 1.6 wt. %, or of about 1.8 wt. %, or of about 2.0 wt. %, or of about 2.2 wt. %, or of about 2.4 wt. %, or of about 2.6 wt. %, or of about 2.8 wt. %, or of about 3.0 wt. % of the wear-resistant rubber composition. In some embodiments, "about," as used in the preceding sentence, includes plus or minus 0.2 wt. %. In some embodiments, a wear-resistant rubber composition may comprise about 0.8 parts per hundred rubber (Phr) of at least one vulcanization accelerant, or about 1.0 Phr of at least one vulcanization accelerant, or about 1.2 Phr of at least one vulcanization accelerant, or about 1.4 Phr of at least one vulcanization accelerant, or about 1.6 Phr of at least one vulcanization accelerant, or about 1.8 Phr of at least one vulcanization accelerant, or about 2.0 Phr of at least one vulcanization accelerant, or about 2.2 Phr of at least one vulcanization accelerant, or about 2.4 Phr of at least one vulcanization accelerant, or about 2.6 Phr of at least one vulcanization accelerant, or about 2.8 Phr of at least one vulcanization accelerant, or about 3.0 Phr of at least one vulcanization accelerant, or about 3.5 Phr of at least one vulcanization accelerant, or about 4.0 Phr of at least one vulcanization accelerant. In some embodiments, "about," as used in the preceding sentence, includes plus or minus 0.25 Phr.

According to some embodiments, a wear-resistant rubber composition may comprise a peroxide (e.g., Dicup 40KE Peroxide, hydrogen peroxide, 40% Dicumyl Peroxide) content of about 0.1 wt. %, of about 0.2 wt. %, or of about 0.3 wt. %, or of about 0.4 wt. %, or of about 0.5 wt. %, or of about 0.6 wt. %, or of about 0.7 wt. %, or of about 0.8 wt. %, or of about 0.9 wt. %, or of about 1.0 wt. %, or of about 1.25 wt. %, or of about 1.5 wt. % of the wear-resistant rubber composition. In some embodiments, "about," as used in the preceding sentence, includes plus or minus 0.1 wt. %.

In some specific example embodiments, a wear-resistant rubber composition may comprise the following composition, as shown in Table 1 (Composition A):

TABLE 1

Composition of Degradable Composition A

| Material Description | Parts Per Hundred (Phr) |
| --- | --- |
| Natural Rubber (e.g., Polyisoprene, SVR10) | 30-90 (e.g., 70.5) |
| Polybutadiene (e.g., high cis polybutadiene) | 10-40 (e.g., 30.7) |
| hydroxy-terminated polybutadiene (e.g., Poly Bd R20LM) | 1-10 (e.g., 5) |
| Peptizer (e.g., Struktol A60) | 1-10 (e.g., 1.8) |
| Silica (e.g., Hisil 190G) | 30-80 (e.g., 60.05) |
| Coupling agent (e.g., SI-69) | 1-10 (e.g., 8.2) |
| Antiozonant (e.g., Luxco 2085) | 1-10 (e.g., 1.8) |
| Polymerization accelerant (e.g., Stearic acid) | 1-10 (e.g., 1.8) |
| Plasticizer (e.g., Tarene 30) | 1-10 (e.g., 2.5) |
| Processing additive (e.g., Struktol HT 207) | 1-10 (e.g., 2.8) |
| Antiozonant (e.g., 6PPD) | 1-10 (e.g., 1.3) |
| Polymerization accelerant (e.g., CBS) | 1-10 (e.g., 1.3) |
| Polymerization accelerant (e.g., TbzTD) | 01-1 (e.g., 0.24) |
| Sulfur | 0.1-2 (e.g., 0.9) |
| Carbon black (e.g., N-326) | 0.1-5 (e.g., 1.2) |
| Vulcanization inhibitor (e.g., PVI) | 0.1-5 (e.g., 0.6) |
| Polymerization accelerant (e.g., zinc oxide) | 1-10 (e.g., 7) |

In some specific example embodiments, a wear-resistant rubber composition may comprise the following composition, as shown in Table 2 (Composition B):

TABLE 2

Composition of Degradable Composition B

| Material Description | Parts Per Hundred (Phr) |
| --- | --- |
| Natural Rubber (e.g., Polyisoprene, SVR10) | 30-90 (e.g., 76.05) |
| Polybutadiene (e.g., high cis polybutadiene) | 10-40 (e.g., 25.5) |
| hydroxy-terminated polybutadiene (e.g., Poly Bd R20LM) | 1-10 (e.g., 2.5) |
| Peptizer (e.g., Struktol A60) | 1-10 (e.g., 1.8) |
| Silica (e.g., Hisil 190G) | 30-80 (e.g., 49.6) |
| Coupling agent (e.g., SI-69) | 1-10 (e.g., 7.25) |
| Antiozonant (e.g., Luxco 2085) | 1-10 (e.g., 1.45) |
| Polymerization accelerant (e.g., Stearic acid) | 1-10 (e.g., 1.45) |
| Plasticizer (e.g., Tarene 30) | 1-10 (e.g., 1.8) |
| Processing additive (e.g., Struktol HT 207) | 1-10 (e.g., 1.5) |
| Antiozonant (e.g., 6PPD) | 1-10 (e.g., 1.7) |
| Polymerization accelerant (e.g., CBS) | 1-10 (e.g., 1.6) |
| Polymerization accelerant (e.g., TbzTD) | 01-1 (e.g., 0.3) |
| Sulfur | 0.1-2 (e.g., 0.9) |
| Carbon black (e.g., N-326) | 0.1-5 (e.g., 0.7) |
| Vulcanization inhibitor (e.g., PVI) | 0.1-5 (e.g., 0.6) |
| Polymerization accelerant (e.g., zinc oxide) | 1-10 (e.g., 6) |

In some specific example embodiments, a wear-resistant rubber composition may comprise the following composition, as shown in Table 3 (Composition C):

TABLE 3

Composition of Degradable Composition C

| Material Description | Parts Per Hundred (Phr) |
| --- | --- |
| Natural Rubber (e.g., Polyisoprene, SVR10) | 30-90 (e.g., 65.5) |
| Polybutadiene (e.g., high cis polybutadiene) | 10-40 (e.g., 35.4) |
| hydroxy-terminated polybutadiene (e.g., Poly Bd R20LM) | 1-10 (e.g., 6) |
| Peptizer (e.g., Struktol A60) | 1-10 (e.g., 1.6) |
| Silica (e.g., Hisil 190G) | 30-80 (e.g., 55.7) |
| Coupling agent (e.g., SI-69) | 1-10 (e.g., 5.5) |
| Antiozonant (e.g., Luxco 2085) | 1-10 (e.g., 8.7) |
| Polymerization accelerant (e.g., Stearic acid) | 1-10 (e.g., 7.5) |
| Plasticizer (e.g., Tarene 30) | 1-10 (e.g., 5) |
| Processing additive (e.g., Struktol HT 207) | 1-10 (e.g., 5.1) |
| Antiozonant (e.g., 6PPD) | 1-10 (e.g., 5.1) |
| Polymerization accelerant (e.g., CBS) | 1-10 (e.g., 3.4) |
| Polymerization accelerant (e.g., TbzTD) | 01-1 (e.g., 0.25) |
| Sulfur | 0.1-2 (e.g., 1.5) |
| Carbon black (e.g., N-326) | 0.1-5 (e.g., 0.6) |
| Vulcanization inhibitor (e.g., PVI) | 0.1-5 (e.g., 2.1) |
| Polymerization accelerant (e.g., zinc oxide) | 1-10 (e.g., 9) |

In some specific example embodiments, a wear-resistant rubber composition may comprise the following composition, as shown in Table 4 (Composition D):

TABLE 4

Composition of Degradable Composition D

| Material Description | Parts Per Hundred (Phr) |
| --- | --- |
| Natural Rubber (e.g., Polyisoprene, SVR10) | 30-90 (e.g., 70.5) |
| Polybutadiene (e.g., high cis polybutadiene) | 10-40 (e.g., 30.5) |
| hydroxy-terminated polybutadiene (e.g., Poly Bd R20LM) | 1-10 (e.g., 8) |
| Peptizer (e.g., Struktol A60) | 1-10 (e.g., 6) |
| Silica (e.g., Hisil 190G) | 30-80 (e.g., 45.35) |
| Coupling agent (e.g., SI-69) | 1-10 (e.g., 5.5) |
| Antiozonant (e.g., Luxco 2085) | 1-10 (e.g., 4.1) |
| Polymerization accelerant (e.g., Stearic acid) | 1-10 (e.g., 3.1) |
| Plasticizer (e.g., Tarene 30) | 1-10 (e.g., 9) |
| Processing additive (e.g., Struktol HT 207) | 1-10 (e.g., 4.5) |
| Antiozonant (e.g., 6PPD) | 1-10 (e.g., 8.5) |
| Polymerization accelerant (e.g., CBS) | 1-10 (e.g., 5.5) |
| Polymerization accelerant (e.g., TbzTD) | 01-1 (e.g., 4.5) |

TABLE 4-continued

Composition of Degradable Composition D

| Material Description | Parts Per Hundred (Phr) |
|---|---|
| Sulfur | 0.1-2 (e.g., 0.5) |
| Carbon black (e.g., N-326) | 0.1-5 (e.g., 3.5) |
| Vulcanization inhibitor (e.g., PVI) | 0.1-5 (e.g., 3.5) |
| Polymerization accelerant (e.g., zinc oxide) | 1-10 (e.g., 6.5) |

In some specific example embodiments, a wear-resistant rubber composition may comprise the following composition, as shown in Table 5 (Composition E):

TABLE 5

Composition of Degradable Composition E

| Material Description | Parts Per Hundred (Phr) |
|---|---|
| Natural Rubber (e.g., Polyisoprene, SVR10) | 30-90 (e.g., 85.1) |
| Polybutadiene (e.g., high cis polybutadiene) | 10-40 (e.g., 15.4) |
| hydroxy-terminated polybutadiene (e.g., Poly Bd R20LM) | 1-10 (e.g., 3) |
| Peptizer (e.g., Struktol A60) | 1-10 (e.g., 9) |
| Silica (e.g., Hisil 190G) | 30-80 (e.g., 40.8) |
| Coupling agent (e.g., SI-69) | 1-10 (e.g., 5.5) |
| Antiozonant (e.g., Luxco 2085) | 1-10 (e.g., 5.52) |
| Polymerization accelerant (e.g., Stearic acid) | 1-10 (e.g., 5.52) |
| Plasticizer (e.g., Tarene 30) | 1-10 (e.g., 5.4) |
| Processing additive (e.g., Struktol HT 207) | 1-10 (e.g., 7.1) |
| Antiozonant (e.g., 6PPD) | 1-10 (e.g., 4.6) |
| Polymerization accelerant (e.g., CBS) | 1-10 (e.g., 6.5) |
| Polymerization accelerant (e.g., TbzTD) | 01-1 (e.g., 1.1) |
| Sulfur | 0.1-2 (e.g., 1.4) |
| Carbon black (e.g., N-326) | 0.1-5 (e.g., 3.5) |
| Vulcanization inhibitor (e.g., PVI) | 0.1-5 (e.g., 4.4) |
| Polymerization accelerant (e.g., zinc oxide) | 1-10 (e.g., 8) |

In some specific example embodiments, a wear-resistant rubber composition may comprise the following composition, as shown in Table 6 (Composition F):

TABLE 6

Composition of Degradable Composition F

| Material Description | Parts Per Hundred (Phr) |
|---|---|
| Natural Rubber (e.g., Polyisoprene, SVR10) | 30-90 (e.g., 62.6) |
| Polybutadiene (e.g., high cis polybutadiene) | 10-40 (e.g., 37.5) |
| hydroxy-terminated polybutadiene (e.g., Poly Bd R20LM) | 1-10 (e.g., 9.5) |
| Peptizer (e.g., Struktol A60) | 1-10 (e.g., 2) |
| Silica (e.g., Hisil 190G) | 30-80 (e.g., 35.52) |
| Coupling agent (e.g., SI-69) | 1-10 (e.g., 7.5) |
| Antiozonant (e.g., Luxco 2085) | 1-10 (e.g., 8.5) |
| Polymerization accelerant (e.g., Stearic acid) | 1-10 (e.g., 7.6) |
| Plasticizer (e.g., Tarene 30) | 1-10 (e.g., 3.5) |
| Processing additive (e.g., Struktol HT 207) | 1-10 (e.g., 6.5) |
| Antiozonant (e.g., 6PPD) | 1-10 (e.g., 4.3) |
| Polymerization accelerant (e.g., CBS) | 1-10 (e.g., 3.5) |
| Polymerization accelerant (e.g., TbzTD) | 01-1 (e.g., 0.4) |
| Sulfur | 0.1-2 (e.g., 1.9) |
| Carbon black (e.g., N-326) | 0.1-5 (e.g., 1.4) |
| Vulcanization inhibitor (e.g., PVI) | 0.1-5 (e.g., 0.8) |
| Polymerization accelerant (e.g., zinc oxide) | 1-10 (e.g., 7.5) |

In some specific example embodiments, a wear-resistant rubber composition may comprise the following composition, as shown in Table 7 (Composition G):

TABLE 7

Composition of Degradable Composition G

| Material Description | Parts Per Hundred (Phr) |
|---|---|
| Natural Rubber (e.g., Polyisoprene, SVR10) | 30-90 (e.g., 80.4) |
| Polybutadiene (e.g., high cis polybutadiene) | 10-40 (e.g., 10.3) |
| hydroxy-terminated polybutadiene (e.g., Poly Bd R20LM) | 1-10 (e.g., 6) |
| Peptizer (e.g., Struktol A60) | 1-10 (e.g., 1.4) |
| Silica (e.g., Hisil 190G) | 30-80 (e.g., 45.6) |
| Coupling agent (e.g., SI-69) | 1-10 (e.g., 5.4) |
| Antiozonant (e.g., Luxco 2085) | 1-10 (e.g., 1.4) |
| Polymerization accelerant (e.g., Stearic acid) | 1-10 (e.g., 5.2) |
| Plasticizer (e.g., Tarene 30) | 1-10 (e.g., 5) |
| Processing additive (e.g., Struktol HT 207) | 1-10 (e.g., 4.05) |
| Antiozonant (e.g., 6PPD) | 1-10 (e.g., 3.52) |
| Polymerization accelerant (e.g., CBS) | 1-10 (e.g., 6.5) |
| Polymerization accelerant (e.g., TbzTD) | 01-1 (e.g., 0.9) |
| Sulfur | 0.1-2 (e.g., 1.3) |
| Carbon black (e.g., N-326) | 0.1-5 (e.g., 1.4) |
| Vulcanization inhibitor (e.g., PVI) | 0.1-5 (e.g., 0.4) |
| Polymerization accelerant (e.g., zinc oxide) | 1-10 (e.g., 8) |

In some specific example embodiments, a wear-resistant rubber composition may comprise the following composition, as shown in Table 8 (Composition H):

TABLE 8

Composition of Degradable Composition H

| Material Description | Parts Per Hundred (Phr) |
|---|---|
| Natural Rubber (e.g., Polyisoprene, SVR10) | 30-90 (e.g., 55.5) |
| Polybutadiene (e.g., high cis polybutadiene) | 10-40 (e.g., 45.8) |
| hydroxy-terminated polybutadiene (e.g., Poly Bd R20LM) | 1-10 (e.g., 3.5) |
| Peptizer (e.g., Struktol A60) | 1-10 (e.g., 2.7) |
| Silica (e.g., Hisil 190G) | 30-80 (e.g., 44.8) |
| Coupling agent (e.g., SI-69) | 1-10 (e.g., 5.4) |
| Antiozonant (e.g., Luxco 2085) | 1-10 (e.g., 3.3) |
| Polymerization accelerant (e.g., Stearic acid) | 1-10 (e.g., 6.4) |
| Plasticizer (e.g., Tarene 30) | 1-10 (e.g., 2.6) |
| Processing additive (e.g., Struktol HT 207) | 1-10 (e.g., 3.3) |
| Antiozonant (e.g., 6PPD) | 1-10 (e.g., 4.5) |
| Polymerization accelerant (e.g., CBS) | 1-10 (e.g., 8.4) |
| Polymerization accelerant (e.g., TbzTD) | 01-1 (e.g., 0.6) |
| Sulfur | 0.1-2 (e.g., 1.4) |
| Carbon black (e.g., N-326) | 0.1-5 (e.g., 0.8) |
| Vulcanization inhibitor (e.g., PVI) | 0.1-5 (e.g., 4.4) |
| Polymerization accelerant (e.g., zinc oxide) | 1-10 (e.g., 10) |

In some specific example embodiments, a wear-resistant rubber composition may comprise the following composition, as shown in Table 9 (Composition I):

TABLE 9

Composition of Degradable Composition I

| Material Description | Parts Per Hundred (Phr) |
|---|---|
| Natural Rubber (e.g., Polyisoprene, SVR10) | 30-90 (e.g., 83.03) |
| Polybutadiene (e.g., high cis polybutadiene) | 10-40 (e.g., 16.97) |
| hydroxy-terminated polybutadiene (e.g., Poly Bd R20LM) | 1-10 (e.g., 4) |
| Peptizer (e.g., Struktol A60) | 1-10 (e.g., 2) |
| Silica (e.g., Hisil 190G) | 30-80 (e.g., 60.58) |
| Coupling agent (e.g., SI-69) | 1-10 (e.g., 6.58) |
| Antiozonant (e.g., Luxco 2085) | 1-10 (e.g., 1.52) |
| Polymerization accelerant (e.g., Stearic acid) | 1-10 (e.g., 1.52) |
| Plasticizer (e.g., Tarene 30) | 1-10 (e.g., 2) |
| Processing additive (e.g., Struktol HT 207) | 1-10 (e.g., 2.05) |
| Antiozonant (e.g., 6PPD) | 1-10 (e.g., 1.52) |
| Polymerization accelerant (e.g., CBS) | 1-10 (e.g., 1.5) |
| Polymerization accelerant (e.g., TbzTD) | 01-1 (e.g., 0.2) |

TABLE 9-continued

Composition of Degradable Composition I

| Material Description | Parts Per Hundred (Phr) |
| --- | --- |
| Sulfur | 0.1-2 (e.g., 0.7) |
| Carbon black (e.g., N-326) | 0.1-5 (e.g., 1) |
| Vulcanization inhibitor (e.g., PVI) | 0.1-5 (e.g., 0.5) |
| Polymerization accelerant (e.g., zinc oxide) | 1-10 (e.g., 5) |

In some specific example embodiments, a wear-resistant rubber composition may comprise the following composition, as shown in Table 10 (Composition J):

TABLE 10

Composition of Degradable Composition J

| Material Description | Parts Per Hundred (Phr) |
| --- | --- |
| Natural Rubber (e.g., Polyisoprene, SVR10) | 30-90 (e.g., 56.56) |
| Polybutadiene (e.g., high cis polybutadiene) | 10-40 (e.g., 39.4) |
| hydroxy-terminated polybutadiene (e.g., Poly Bd R20LM) | 1-10 (e.g., 9) |
| Peptizer (e.g., Struktol A60) | 1-10 (e.g., 6) |
| Silica (e.g., Hisil 190G) | 30-80 (e.g., 44) |
| Coupling agent (e.g., SI-69) | 1-10 (e.g., 4.83) |
| Antiozonant (e.g., Luxco 2085) | 1-10 (e.g., 6.6) |
| Polymerization accelerant (e.g., Stearic acid) | 1-10 (e.g., 4.5) |
| Plasticizer (e.g., Tarene 30) | 1-10 (e.g., 3.4) |
| Processing additive (e.g., Struktol HT 207) | 1-10 (e.g., 4.8) |
| Antiozonant (e.g., 6PPD) | 1-10 (e.g., 3.3) |
| Polymerization accelerant (e.g., CBS) | 1-10 (e.g., 2.8) |
| Polymerization accelerant (e.g., TbzTD) | 01-1 (e.g., 0.1) |
| Sulfur | 0.1-2 (e.g., 1.7) |
| Carbon black (e.g., N-326) | 0.1-5 (e.g., 3) |
| Vulcanization inhibitor (e.g., PVI) | 0.1-5 (e.g., 0.9) |
| Polymerization accelerant (e.g., zinc oxide) | 1-10 (e.g., 3) |

In some specific example embodiments, a wear-resistant rubber composition may comprise the following composition, as shown in Table 11 (Composition K):

TABLE 11

Composition of Degradable Composition K

| Material Description | Parts Per Hundred (Phr) |
| --- | --- |
| Natural Rubber (e.g., Polyisoprene, SVR10) | 30-90 (e.g., 57.14) |
| Polybutadiene (e.g., high cis polybutadiene) | 20-50 (e.g., 42.9) |
| Antidegradant (e.g., TMQ) | 0.1-2 (e.g., 0.7) |
| Antiozonant (e.g., Luxco 2085) | 1-10 (e.g., 1) |
| Polymerization accelerant (e.g., Stearic acid) | 1-10 (e.g., 2.0) |
| Processing additive (e.g., Raffex 90) | 5-15 (e.g., 10.5) |
| Antiozonant (e.g., 6PPD) | 0.1-1.5 (e.g., 0.74) |
| Sulfur | 0.1-2 (e.g., 1.5) |
| Carbon black (e.g., N-234) | 30-70 (e.g., 55.7) |
| Antioxidant (e.g., methyl methacrylate butadiene styrene) | 0.1-5 (e.g., 1.2) |
| Polymerization accelerant (e.g., zinc oxide) | 1-10 (e.g., 3) |

In some specific example embodiments, a wear-resistant rubber composition may comprise the following composition, as shown in Table 12 (Composition L):

TABLE 12

Composition of Degradable Composition L

| Material Description | Parts Per Hundred (Phr) |
| --- | --- |
| Natural Rubber (e.g., Polyisoprene, SVR10) | 30-90 (e.g., 50.6) |
| Polybutadiene (e.g., high cis polybutadiene) | 20-50 (e.g., 46.4) |
| Antidegradant (e.g., TMQ) | 0.1-2 (e.g., 0.9) |

TABLE 12-continued

Composition of Degradable Composition L

| Material Description | Parts Per Hundred (Phr) |
| --- | --- |
| Antiozonant (e.g., Luxco 2085) | 1-10 (e.g., 2.5) |
| Polymerization accelerant (e.g., Stearic acid) | 1-10 (e.g., 3.5) |
| Processing additive (e.g., Raffex 90) | 5-15 (e.g., 5.4) |
| Antiozonant (e.g., 6PPD) | 0.1-1.5 (e.g., 1.4) |
| Sulfur | 0.1-2 (e.g., 0.9) |
| Carbon black (e.g., N-234) | 30-70 (e.g., 45.3) |
| Antioxidant (e.g., methyl methacrylate butadiene styrene) | 0.1-5 (e.g., 2.2) |
| Polymerization accelerant (e.g., zinc oxide) | 1-10 (e.g., 2.6) |

In some embodiments, a wear-resistant rubber composition, after curing, may have a Shore A hardness of, at least about 15, or at least about 20, or at least about 25, or at least about 30, or at least about 35, or at least about 40. In some embodiments, a wear-resistant rubber composition, after curing and substantially swelling, may have a Shore A hardness of at least about 20, or about 25, or about 30.

Wear Resistance

In some embodiments, a wear-resistant rubber composition may resist wear comprising fretting wear, erosive wear, oxidation wear, corrosion wear, or combinations thereof. A wear-resistant rubber composition may resist wear over a period of time, the period of time comprising at least about 1 week, at least about 2 weeks, at least about 3 weeks, at least about 4 weeks, at least about 6 weeks, at least about 8 weeks, at least about 10 weeks, at least about 12 weeks, at least about 14 weeks, at least about 16 weeks, at least about 18 weeks, at least about 20 weeks, at least about 22 weeks, at least about 24 weeks, at least about 26 weeks, at least about 28 weeks, and at least about 30 weeks. In some embodiments, "about," as used in the preceding sentence, includes plus or minus 1 week. According to some embodiments, a wear-resistant rubber composition may wear at most about 1%, or at most about 2%, or at most about 5%, or at most about 10%, or at most about 15%, or at most about 20%, or at most about 25%, or at most about 30%, or at most about 35%, or at most about 40%, or at most about 45%, or at most about 50%. In some embodiments, a wear-resistant rubber composition may wear at most about 10% in about four weeks, or at most about 20% in about four weeks, or at most about 30% in about four weeks. In some embodiments, a wear-resistant rubber composition may wear at most about 10% in about eight weeks, or at most about 20% in about eight weeks, or at most about 30% in about eight weeks. In some embodiments, a wear-resistant rubber composition may wear at most about 10% in about 12 weeks, or at most about 20% in about 12 weeks, or at most about 30% in about 12 weeks. In some embodiments, a wear-resistant rubber composition may wear at most about 10% in about 16 weeks, or at most about 20% in about 16 weeks, or at most about 30% in about 16 weeks. In some embodiments, a wear-resistant rubber composition may wear at most about 10% in about 20 weeks, or at most about 20% in about 20 weeks, or at most about 30% in about 20 weeks. In some embodiments, a wear-resistant rubber composition may wear at most about 10% in about 24 weeks, or at most about 20% in about 24 weeks, or at most about 30% in about 24 weeks. According to some embodiments, wear resistance may be assessed using the material loss in weight over the certain period of time the wear-resistant rubber composition (e.g., lifter bar) is in use. An initial weight of a wear-resistant rubber composition (e.g., lifter bar) may be compared with a final weight of the wear-resistant rubber composition to provide a wear in weight loss over a period of time, for example a 24 week period. In some embodiments, a percentage wear is calculated by taking a weight remaining at the end of a specified test period and divided the weight remaining at the end of the specified test period by weight at the beginning of the specified test period, and then multiplying that value by 100%. According to some embodiments, a lifter bar percentage wear is calculated by taking a weight of said lifter bar remaining at the end of a specified test period and divided the weight of said lifter bar remaining at the end of the specified test period by weight of said lifter bar at the beginning of the specified test period, and then multiplying that value by 100%. In some embodiments, wear of rubber material may be achieved or simulated by any suitable means including any standardized test method (e.g., tests promulgated by the American National Standards Institute, ASTM International, or similar organizations). For example, wear of a lifter bar may be induced by continuous, sustained, periodic, intermittent, or other high intensity impact from larger material (e.g., milled material and mill balls) as the mill spins. In some embodiments, wear-resistance, shock absorption, and dampening properties of a wear-resistant rubber composition may contribute (e.g., separately or in combination) to improvements in wear performance of a wear-resistant rubber composition (e.g., lifter bar).

Lifter Bar Assemblies

A grinding mill, according to some embodiments, may comprise a generally cylindrical drum with openings at one and/or both ends of the drum, at least one lifter bar assembly spaced about the inside wall of the drum, and at least one mill liner. In some embodiments, a grinding mill may further comprise at least one steel ball. In some embodiments, a typical grinding mill may further comprise a substance to be milled, wherein as a drum of the grinding mill is rotated, at least one lifter bar assembly lifts the substance to be milled and at least one steel ball. At some point during rotation of a drum, a substance to be milled and at least one steel ball displaces from at least one lifter bar assembly, wherein the substance to be milled may impact on at least one surface, the at least one surface comprising the at least one steel ball, the substance to be milled, the at least one lifter bar assembly, at least one mill liner, a cylindrical drum, or combinations thereof. As a lifter bar assembly is used in a grinding mill, the lifter bar assembly may wear. A lifter bar assembly may wear while being used in other mining industry processes. Lifter bar assemblies that become worn may have to be replaced, which may increase logistical and financial burdens on the mining and/or milling processes. In some embodiments, a mill liner may wear while being used in a milling process.

According to some embodiments, a lifter bar assembly may comprise at least one rack for fixing the wear resistant lifter bar to a cylindrical wall of a rotating drum of a mill and at least one wear body comprising a wear-resistant rubber composition. In some embodiments, a lifter bar assembly comprising a wear-resistant rubber composition may wear significant less than a lifter bar assembly differing only in that the lifter bar assembly does not comprise at wear-resistant rubber composition.

A lifter bar assembly comprising a wear-resistant rubber composition may resist wear over a period of time, the period of time comprising at least about 1 week, at least about 2 weeks, at least about 3 weeks, at least about 4 weeks, at least about 6 weeks, at least about 8 weeks, at least about 10 weeks, at least about 12 weeks, at least about 14 weeks, at least about 16 weeks, at least about 18 weeks, at least about 20 weeks, at least about 22 weeks, at least about 24 weeks, at least about 26 weeks, at least about 28 weeks, and at least about 30 weeks. In some embodiments, "about," as used in the preceding sentence, includes plus or minus 1 week. According to some embodiments, a lifter bar assembly comprising a wear-resistant rubber composition may wear at most about 1%, or at most about 2%, or at most about 5%, or at most about 10%, or at most about 15%, or at most about 20%, or at most about 25%, or at most about 30%, or at most about 35%, or at most about 40%, or at most about 45%, or at most about 50%. In some embodiments, a lifter bar assembly comprising a wear-resistant rubber composition may wear at most about 10% in about four weeks, or at most about 20% in about four weeks, or at most about 30% in about four weeks. In some embodiments, a lifter bar assembly comprising a wear-resistant rubber composition may wear at most about 10% in about eight weeks, or at most about 20% in about eight weeks, or at most about 30% in about eight weeks. In some embodiments, a lifter bar assembly comprising a wear-resistant rubber composition may wear at most about 10% in about 12 weeks, or at most about 20% in about 12 weeks, or at most about 30% in about 12 weeks. In some embodiments, a lifter bar assembly comprising a wear-resistant rubber composition may wear at most about 10% in about 16 weeks, or at most about 20% in about 16 weeks, or at most about 30% in about 16 weeks. In some embodiments, a lifter bar assembly comprising a wear-resistant rubber composition may wear at most about 10% in about 20 weeks, or at most about 20% in about 20 weeks, or at most about 30% in about 20 weeks. In some embodiments, a lifter bar assembly comprising a wear-resistant rubber composition may wear at most about 10% in about 24 weeks, or at most about 20% in about 24 weeks, or at most about 30% in about 24 weeks.

According to some embodiments, a mill liner may comprise at least one rack for fixing the wear resistant lifter bar to a cylindrical wall of a rotating drum of a mill and at least one wear body comprising a wear-resistant rubber composition. In some embodiments, a mill liner comprising a wear-resistant rubber composition may wear significant less than a mill liner differing only in that the mill liner does not comprise at wear-resistant rubber composition.

A mill liner comprising a wear-resistant rubber composition may resist wear over a period of time, the period of time comprising at least about 1 week, at least about 2 weeks, at least about 3 weeks, at least about 4 weeks, at least about 6 weeks, at least about 8 weeks, at least about 10 weeks, at least about 12 weeks, at least about 14 weeks, at least about 16 weeks, at least about 18 weeks, at least about 20 weeks, at least about 22 weeks, at least about 24 weeks, at least about 26 weeks, at least about 28 weeks, and at least about 30 weeks. In some embodiments, "about," as used in the preceding sentence, includes plus or minus 1 week. According to some embodiments, a mill liner comprising a wear-resistant rubber composition may wear at most about 1%, or at most about 2%, or at most about 5%, or at most about 10%, or at most about 15%, or at most about 20%, or at most about 25%, or at most about 30%, or at most about 35%, or at most about 40%, or at most about 45%, or at most about 50%. In some embodiments, a mill liner comprising a wear-resistant rubber composition may wear at most about 10% in about four weeks, or at most about 20% in about four weeks, or at most about 30% in about four weeks. In some embodiments, a mill liner comprising a wear-resistant rubber composition may wear at most about 10% in about eight weeks, or at most about 20% in about eight weeks, or at most about 30% in about eight weeks. In some embodiments, a mill liner comprising a wear-resistant rubber composition may wear at most about 10% in about 12 weeks, or at most about 20% in about 12 weeks, or at most about 30% in about 12 weeks. In some embodiments, a mill liner comprising a wear-resistant rubber composition may wear at most about 10% in about 16 weeks, or at most about 20% in about 16 weeks, or at most about 30% in about 16 weeks. In some embodiments, a mill liner comprising a wear-resistant rubber composition may wear at most about 10% in about 20 weeks, or at most about 20% in about 20 weeks, or at most about 30% in about 20 weeks. In some embodiments, a mill liner comprising a wear-resistant rubber composition may wear at most about 10% in about 24 weeks, or at most about 20% in about 24 weeks, or at most about 30% in about 24 weeks.

Wear-Resistant Shock Absorbers

According to some embodiments, a shock absorber and/or damper may damp shock impulses. In some embodiments, a shock absorber may comprise at least one wear-resistant rubber composition. A shock absorber comprising at least one wear-resistant rubber composition may wear less than a shock absorber not comprising at least one wear-resistant rubber composition, according to some embodiments.

A shock absorber comprising a wear-resistant rubber composition may resist wear over a period of time, the period of time comprising at least about 1 week, at least about 2 weeks, at least about 3 weeks, at least about 4 weeks, at least about 6 weeks, at least about 8 weeks, at least about 10 weeks, at least about 12 weeks, at least about 14 weeks, at least about 16 weeks, at least about 18 weeks, at least about 20 weeks, at least about 22 weeks, at least about 24 weeks, at least about 26 weeks, at least about 28 weeks, and at least about 30 weeks. In some embodiments, "about," as used in the preceding sentence, includes plus or minus 1 week. According to some embodiments, a shock absorber comprising a wear-resistant rubber composition may wear at most about 1%, or at most about 2%, or at most about 5%, or at most about 10%, or at most about 15%, or at most about 20%, or at most about 25%, or at most about 30%, or at most about 35%, or at most about 40%, or at most about 45%, or at most about 50%. In some embodiments, a shock absorber comprising a wear-resistant rubber composition may wear at most about 10% in about four weeks, or at most about 20% in about four weeks, or at most about 30% in about four weeks. In some embodiments, a shock absorber comprising a wear-resistant rubber composition may wear at most about 10% in about eight weeks, or at most about 20% in about eight weeks, or at most about 30% in about eight weeks. In some embodiments, a shock absorber comprising a wear-resistant rubber composition may wear at most about 10% in about 12 weeks, or at most about 20% in about 12 weeks, or at most about 30% in about 12 weeks. In some embodiments, a shock absorber comprising a wear-resistant rubber composition may wear at most about 10% in about 16 weeks, or at most about 20% in about 16 weeks, or at most about 30% in about 16 weeks. In some embodiments, a shock absorber comprising a wear-resistant rubber composition may wear at most about 10% in about 20 weeks, or at most about 20% in about 20 weeks, or at most about 30% in about 20 weeks. In some embodiments, a shock absorber comprising a wear-resistant rubber composition may wear at most about 10% in about 24 weeks, or at most about 20% in about 24 weeks, or at most about 30% in about 24 weeks.

It is understood that the listed apparatuses for each unit are for illustration purposes only, and this is not intended to limit the scope of the application. A specific combination of these or other apparatuses or units can be configured in such a system for the intended use based on the teachings in the application.

Persons skilled in the art may make various changes in the shape, size, number, separation characteristic, and/or arrangement of parts without departing from the scope of the instant disclosure. Persons skilled in the art may make various changes in the kind, number, and/or arrangement of R-groups, substituents, and/or heteroatoms without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. Where desired, some embodiments of the disclosure may be practiced to the exclusion of other embodiments.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value +/−about 10%, depicted value +/−about 50%, depicted value +/−about 100%) and/or a range endpoint. With respect to the former, a value of 50 depicted in an example, table, and/or drawing may form the basis of a range of, for example, about 45 to about 55, about 25 to about 100, and/or about 0 to about 100.

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1

Degradable Test Formulas

Nine wear-resistant rubber compositions were created using varying polymer distributions to compare the difference in rheological and physical properties (Table 13). Concentrations of hydroxy-terminated polybutadiene were varied in each sample, wherein a control sample with 0 Phr hydroxy-terminated polybutadiene (Liq. PBD) was compared to eight other wear-resistant rubber compositions with incrementally increasing concentrations of hydroxy-terminated polybutadiene. The range of hydroxy-terminated polybutadiene consists of 0 Phr, 1 Phr, 2 Phr, 3 Phr, 4, Phr, 5 Phr, 6 Phr, 7 Phr, and 8 Phr.

TABLE 13

Rheometer MDR Data for the Nine Compositions Tested

| | Specification | Control 0 Phr Liq. PBD | 2A 1 Phr Liq. PBD | 2B 2 Phr Liq. PBD | 2C 3 Phr Liq. PBD | 2D 4 Phr Liq. PBD | 2E 5 Phr Liq. PBD | 2F 6 Phr Liq. PBD | 2G 7 Phr Liq. PBD | 2H 8 Phr Liq. PBD |
|---|---|---|---|---|---|---|---|---|---|---|
| Rheometer MDR, 4 minutes @ 350° F., 1° Arc | | | | | | | | | | |
| ML, lb-in | 3.50-5.50 | 3.49 | 3.70 | 4.04 | 3.76 | 3.85 | 3.72 | 3.52 | 3.63 | 3.53 |
| Ts2, m:s | 0:50-1:30 | 0:59 | 0:49 | 0:53 | 1:08 | 0:56 | 0:59 | 0:59 | 1:01 | 1:04 |
| TC90, m:s | 2:30-3:30 | 3:10 | 3:10 | 3:08 | 3:13 | 3:13 | 3:13 | 3:14 | 3:14 | 3:13 |
| MH, lb-in | 20.50-27.00 | 22.67 | 23.06 | 23.17 | 20.53 | 20.99 | 19.77 | 19.46 | 19.21 | 18.25 |

Figure 2:
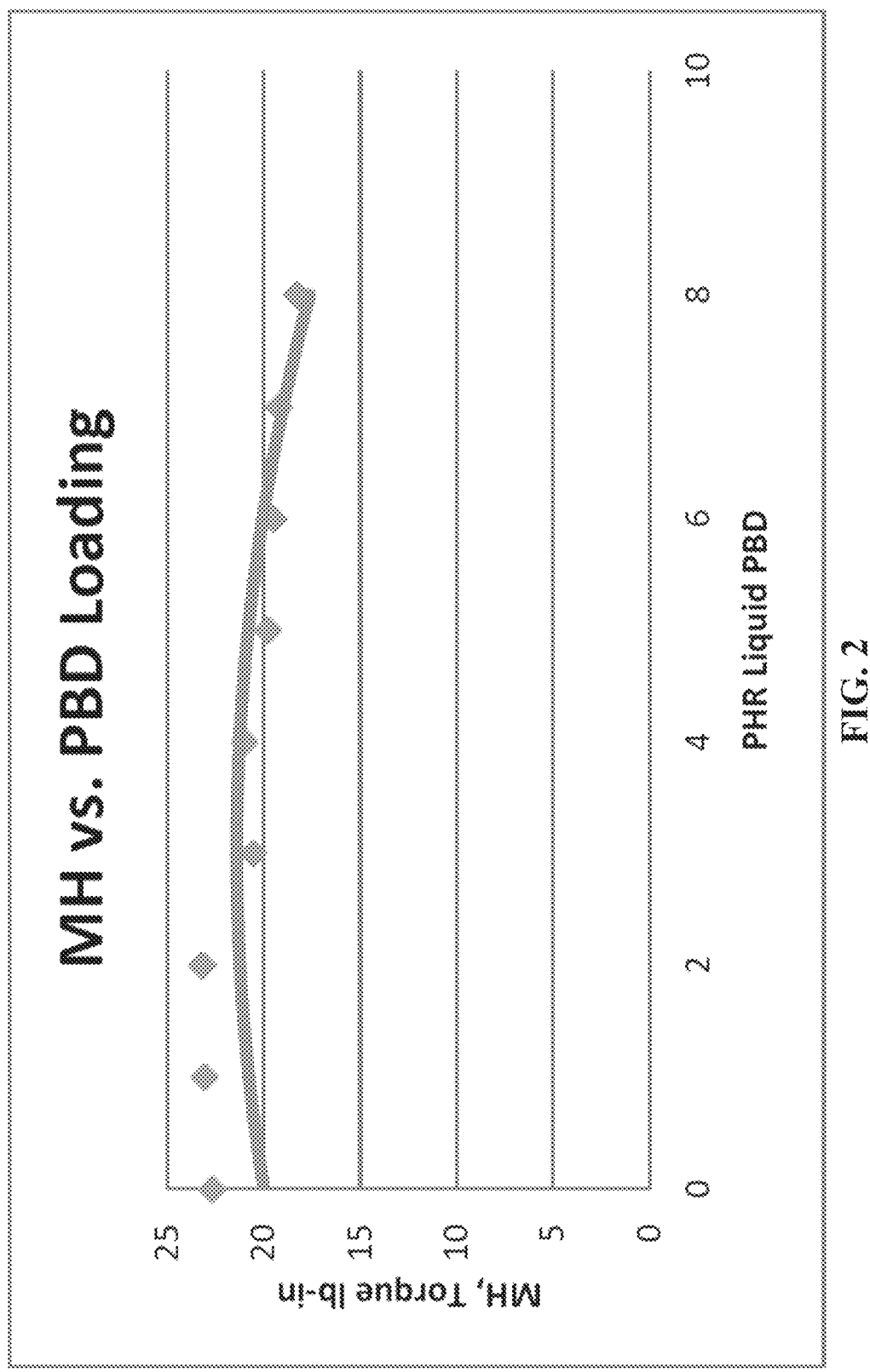
FIG. 2 illustrates differing measured maximum torque values of wear-resistant rubber compositions with varying hydroxy-terminated polybutadiene concentrations, according to specific example embodiments of the disclosure.

Rheometer data for an MH value is illustrated in Table 13 as well as in FIG. 1. FIG. 2 illustrates an increasing and then decreasing trend line of MH values when comparing wear-resistant rubber compositions in the order of control, 2A, 2B, 2C, 2D, 2E, 2F, 2G, and then 2H.

Physical tensile and tear properties were measured per standard cure conditions for the nine wear-resistant rubber compositions. The data can be found in table 14.

TABLE 14

Tensile and Tear Data

| Samples Cured for 30 minutes at 280° F. | Specification | Control 0 Phr Liq. PBD | 2A 1 Phr Liq. PBD | 2B 2 Phr Liq. PBD | 2C 3 Phr Liq. PBD | 2D 4 Phr Liq. PBD | 2E 5 Phr Liq. PBD | 2F 6 Phr Liq. PBD | 2G 7 Phr Liq. PBD | 2H 8 Phr Liq. PBD |
|---|---|---|---|---|---|---|---|---|---|---|
| Shore A | 65 ± 5 | 65 | 65 | 66 | 62 | 64 | 63 | 62 | 63 | 61 |
| Sp. Gr. | 1.18 ± 5 | 1.18 | 1.17 | 1.17 | 1.18 | 1.16 | 1.16 | 1.16 | 1.16 | 1.16 |
| Tear C, lbf/in | 500+ | 682 | 724 | 633 | 551 | 663 | 684 | 600 | 574 | 533 |
| Tensile, PSI | 3200+ | 3653 | 3856 | 3968 | 3611 | 3949 | 3716 | 3650 | 3764 | 3636 |
| Elongation, % | 500+ | 759 | 758 | 815 | 1002 | 994 | 906 | 807 | 704 | 753 |
| 100% Mod, PSI | — | 247 | 285 | 288 | 234 | 264 | 263 | 226 | 251 | 246 |
| 200% Mod, PSI | — | 509 | 626 | 599 | 449 | 579 | 549 | 445 | 580 | 532 |
| 300% Mod, PSI | — | 958 | 1154 | 1098 | 859 | 1004 | 986 | 750 | 1080 | 992 |

Figure 3:
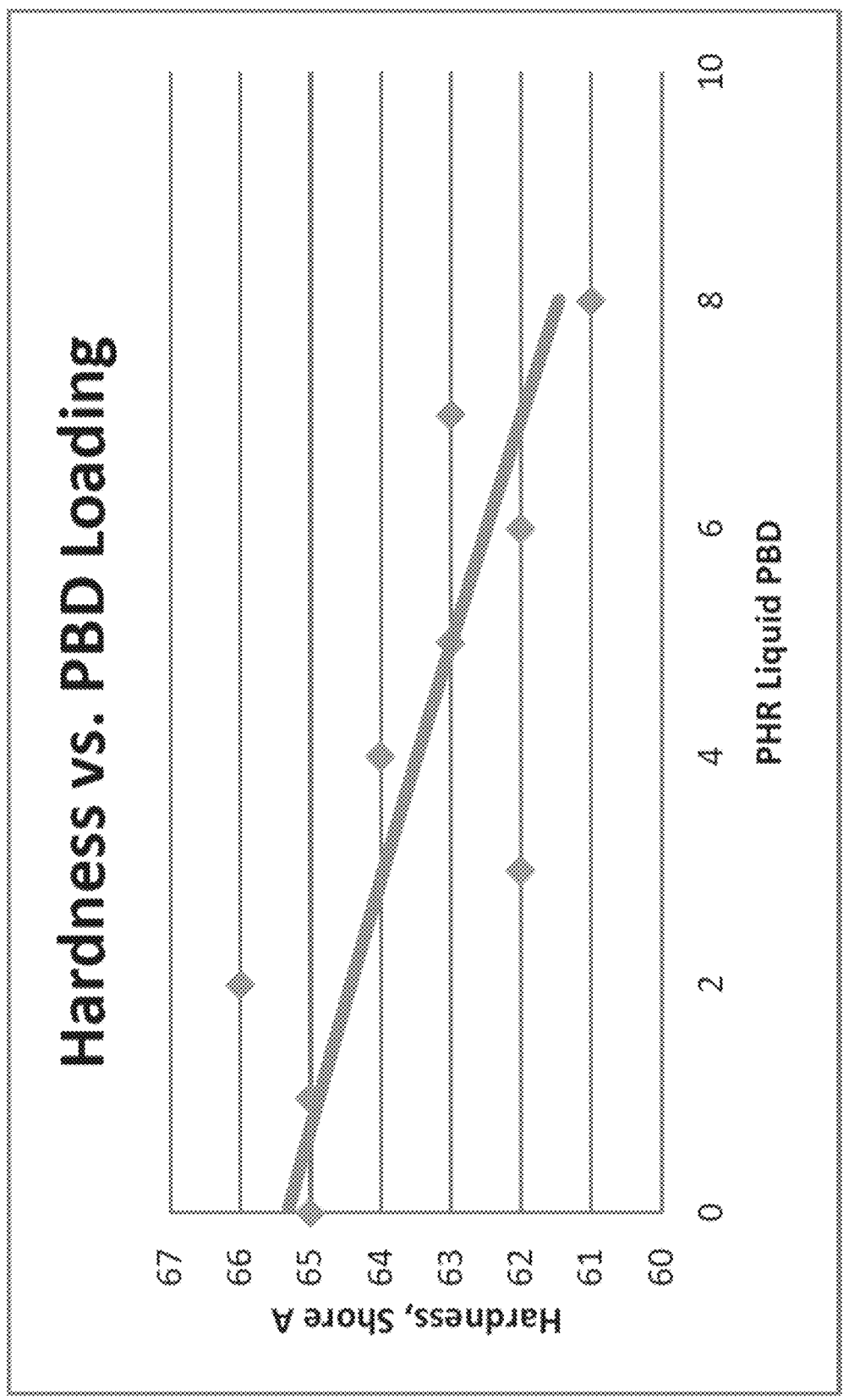
FIG. 3 illustrates differing measured hardness values of wear-resistant rubber compositions with varying hydroxy-terminated polybutadiene concentrations, according to specific example embodiments of the disclosure.
Figure 4:
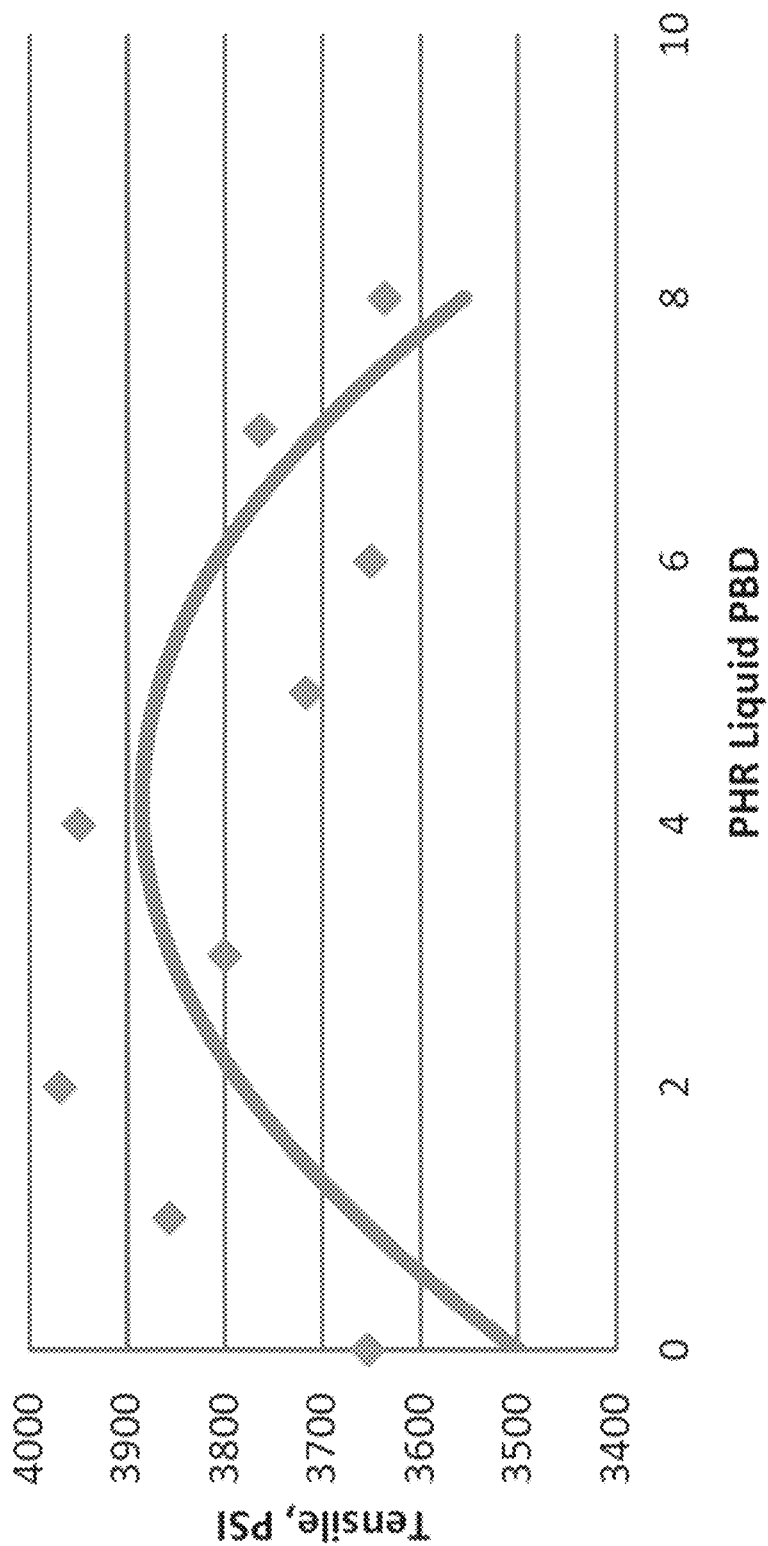
FIG. 4 illustrates differing measured tensile strength values of wear-resistant rubber compositions with varying hydroxy-terminated polybutadiene concentrations, according to specific example embodiments of the disclosure.
Figure 5:
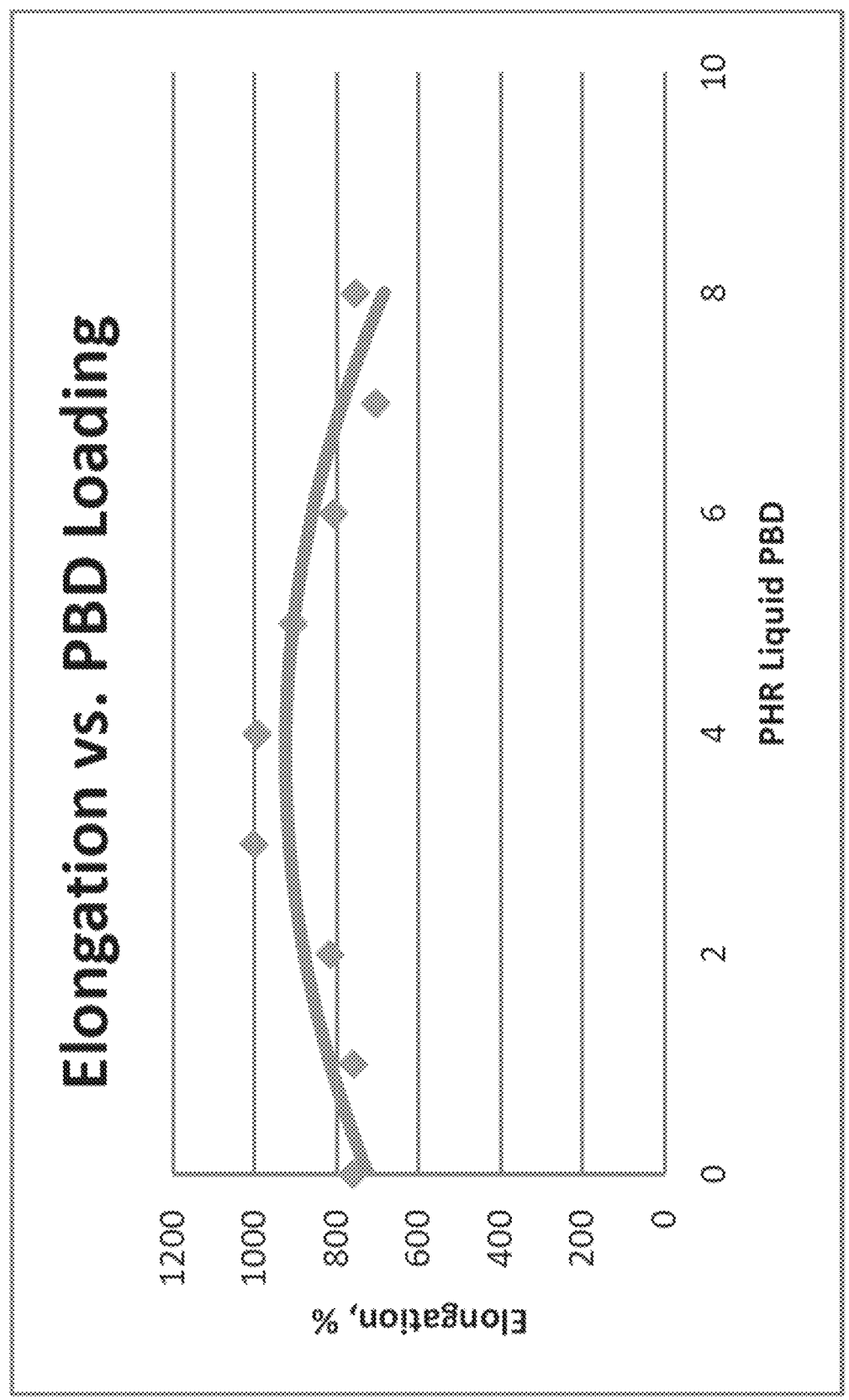
FIG. 5 illustrates elongation measurement values across wear-resistant rubber compositions with varying hydroxy-terminated polybutadiene concentrations, according to specific example embodiments of the disclosure.

Hardness data for each wear-resistant rubber composition was measured and a comparison of the data is illustrated in FIG. 3. Similarly, tensile strength for each wear-resistant rubber composition was measured and a comparison of the data is illustrated in FIG. 4. FIG. 5 illustrates elongation measurement values across the wear-resistant rubber compositions with various hydroxy-terminated polybutadiene concentrations.

Example 2

FIG. 6A illustrates a lifter bar assembly wear testing performed on a period of four weeks on lifter bars comprising a wear-resistant rubber composition according to Compositions K and L. In FIG. 6A, a lifter bar assembly (e.g., 500, 530) comprising a rack (e.g., 570), an unexposed portion (e.g., 580), an exposed portion (e.g., 560), wherein the lifter bar assembly shows wear at 0 weeks (e.g., 510, 540) and wear at 4 weeks (e.g., 520, 550).

FIG. 6B illustrates a lifter bar assembly wear testing performed on a period of four weeks on lifter bars comprising wear-resistant rubber composition according to Compositions A through J. In FIG. 6A, a lifter bar assembly (e.g., 500, 530) comprising a rack (e.g., 570), an unexposed portion (e.g., 580), an exposed portion (e.g., 560), wherein the lifter bar assembly shows wear at 0 weeks (e.g., 510, 540) and wear at 4 weeks (e.g., 520, 550). Over the duration of the lifter bar assembly wear testing, the lifter bars of FIG. 6A, wherein the lifter bars comprised a wear-resistant rubber composition not comprising at least one hydroxy-terminated polybutadiene, wore to a great extent than the lifter bars of FIG. 6B, wherein the lifter bars comprised a wear-resistant rubber composition comprising at least one hydroxy-terminated polybutadiene. Levels of wear can be attained by measuring the difference between the wear at 0 weeks (e.g., 510, 540) and wear at 4 weeks (e.g., 520, 550). The difference between the wear at 0 weeks (e.g., 510, 540) and wear at 4 weeks (e.g., 520, 550) for lifter bars according to Compositions K and L are greater than the difference between the wear at 0 weeks (e.g., 510, 540) and wear at 4 weeks (e.g., 520, 550) for lifter bars according to Compositions A through J.

Example 3

Specific Example Embodiments of a Wear-Resistant Rubber Composition

A wear-resistant rubber composition may be configured to have one or more of the desired qualities disclosed in this application including, for example, abrasion resistance, wear resistance, density of crosslinking, tolerance of salinity, curing temperature, among others, by adjusting the composition of one or more components. Examples of wear-resistant rubber compositions are provided in Table 15.

TABLE 15

Wear-resistant Rubber Compositions

| Formulation (wt. %) | A | B | C | D | E | F | G | H | I | J | K | L | M | N | O | P |
|---|---|---|---|---|---|---|---|---|---|---|---|---|---|---|---|---|
| A natural rubber | 35.4 | 41.5 | 46.8 | 43.5 | 50.4 | 49.1 | 38.9 | 39.8 | 52.2 | 40.8 | 30.6 | 43.5 | 46.4 | 45.9 | 47.4 | 42.9 |
| A polybutadiene | 11.3 | 2.4 | 5.6 | 8.9 | 7.5 | 5.4 | 14.3 | 9.1 | 6.5 | 9.2 | 9.7 | 7.4 | 7.3 | 11.8 | 3.4 | 7.6 |
| A peptizer | 0.5 | 0.7 | 0.1 | 1.0 | 0.5 | 0.7 | 1.1 | 0.6 | 0.6 | 1.9 | 0.8 | 1 | 1.3 | 1.7 | 1 | 0.8 |
| A hydroxy-terminated polybutadiene | 1.2 | 9 | 4.3 | 2.1 | 3.3 | 4.7 | 5.1 | 3.6 | 3.9 | 4.8 | 6.5 | 7.2 | 1.6 | 2.4 | 1.9 | 2 |
| A silica | 25.4 | 32.3 | 25.6 | 31.8 | 25.1 | 24.9 | 25.6 | 33.3 | 22.6 | 30.8 | 40.2 | 25.7 | 29.8 | 25.1 | 25.9 | 36.2 |
| A coupling agent | 2.1 | 1.9 | 1 | 3.5 | 3.9 | 4.5 | 2.9 | 3.3 | 6.1 | 2.6 | 2.2 | 6.1 | 3.3 | 4.5 | 10 | 2.1 |
| A first antiozonant | 2 | 1.4 | 0.9 | 0.8 | 0.6 | 1 | 0.7 | 0.4 | 0.3 | 0.5 | 0.5 | 0.3 | 1.1 | 0.6 | 0.6 | 0.3 |
| A first polymerization accelerant | 1.6 | 0.7 | 2 | 0.8 | 0.1 | 0.7 | 0.4 | 0.3 | 0.2 | 0.7 | 0.3 | 0.2 | 0.9 | 0.2 | 0.1 | 0.5 |
| A plasticizer | 1.8 | 1.1 | 1.1 | 1.0 | 0.6 | 1.3 | 1.9 | 0.1 | 0.4 | 0.9 | 0.1 | 0.6 | 1 | 0.1 | 0.4 | 1.5 |
| A processing additive | 4.7 | 0.8 | 1.9 | 1.1 | 1.6 | 1.6 | 3 | 3 | 2.3 | 3.4 | 3.3 | 1.5 | 3.3 | 3.3 | 3.3 | 1.9 |
| A second antiozonant | 1.9 | 1 | 1.9 | 0.8 | 0.9 | 1.3 | 0.9 | 0.5 | 0.1 | 0.4 | 0.4 | 0.2 | 0.4 | 0.5 | 0.6 | 0.6 |
| A second polymerization accelerant | 1.8 | 1.4 | 1.6 | 0.8 | 1.6 | 0.6 | 0.4 | 0.3 | 0.5 | 0.6 | 0.3 | 1.2 | 0.3 | 0.1 | 0.8 | 0.5 |
| A third polymerization accelerant | 0.6 | 1.6 | 1.1 | 0.1 | 0.7 | 0.2 | 1.6 | 0.4 | 0.6 | 0.3 | 0.6 | 0.8 | 0.1 | 0.3 | 0.2 | 0.3 |
| A sulfur | 0.9 | 1.1 | 0.6 | 0.4 | 0.9 | 0.6 | 0.9 | 0.2 | 0.1 | 0.4 | 1.1 | 0.6 | 0.5 | 0.4 | 0.3 | 0.6 |
| A carbon black | 1.8 | 0.9 | 0.4 | 0.5 | 0.8 | 1.1 | 0.8 | 0.6 | 0.4 | 0.2 | 0.6 | 0.1 | 0.2 | 0.8 | 0.4 | 0.4 |
| A vulcanization inhibitor | 2 | 0.6 | 1.3 | 0.3 | 0.5 | 0.7 | 0.4 | 0.1 | 0.6 | 0.6 | 0.2 | 0.3 | 0.3 | 0.2 | 0.8 | 0.2 |
| A fourth polymerization accelerant | 5 | 1.6 | 3.8 | 2.6 | 1 | 1.6 | 1.1 | 4.4 | 2.6 | 1.9 | 2.6 | 3.3 | 2.2 | 2.1 | 2.9 | 1.6 |

Example 4

A method for determining an effective cross-linking density of a wear-resistant rubber composition can be found in Martin Jr, Donald L. Crosslink Density Determinations for Polymeric Materials. No. RK-TR-70-6. ARMY MISSILE RESEARCH DEVELOPMENT AND ENGINEERING LAB REDSTONE ARSENAL AL PROPULSION DIRECTORATE, 1970. For example, a wear-resistant rubber composition sample with an approximately ¾ inch outside diameter, ½ inch inside diameter, and ¼ inch wide (unswollen condition) was produced. The mass of the sample was recorded. Using a soxhlet extraction device, a wear-resistant rubber composition sample was swelled for 24 hours at 120° F. using the solvent tetrahydrofuran. After swelling, tensile and compression measurements were obtained at a crosshead displacement rate of 0.02 inch per minute, wherein the samples are submerged in solvent during the test. The data obtained was used to calculate effective crosslinking densities.

What is claimed is:

1. An extruded wear-resistant rubber composition comprising:
   at least one hydroxy-terminated polybutadiene;
   at least one natural rubber;
   at least one polymerization accelerant;
   at least one sulfur;
   at least one polybutadiene;
   at least one silica; and
   at least one silane,
   wherein the extruded wear-resistant rubber composition has an effective cross-linking density of at least about $30 \times 10^{-5}$ moles/cm$^3$.

2. The extruded wear-resistant rubber composition of claim 1, further comprising any combination of:
   an antiozonant;
   a vulcanization inhibitor;
   a processing additive; and
   a coupling agent.

3. The extruded wear-resistant rubber composition of claim 2, further comprising any combination of:
   an organosilane additive;
   a peptizer;
   a plasticizer; and
   a carbon black.

4. The extruded wear-resistant rubber composition of claim 2, wherein the at least one natural rubber is present at a concentration ranging from about 20 wt. % to about 70 wt. % of the extruded wear-resistant rubber composition, and further wherein one or more of:
   the at least one polymerization accelerant is selected from the group consisting of zinc oxide, stearic acid, N-cyclohexyl-2-benzothiazole sulfonamide, and tetrabenzyl thiuram disulfide;
   the at least one hydroxy-terminated polybutadiene is present at a concentration ranging from about 1 wt. % to about 10 wt. % of the extruded wear-resistant rubber composition; and
   the at least one processing additive is present at a concentration ranging from about 1 wt. % to about 10 wt. % of the extruded wear-resistant rubber composition.

5. The extruded wear-resistant rubber composition of claim 1, wherein the at least one hydroxy-terminated polybutadiene is present at a concentration of about 2 wt. % of the extruded wear-resistant rubber composition.

6. The extruded wear-resistant rubber composition of claim 1, wherein the at least one polybutadiene is present at a concentration ranging from about 2 wt. % to about 20 wt. % of the extruded wear-resistant rubber composition.

7. The extruded wear-resistant rubber composition of claim 1, wherein the extruded wear-resistant rubber composition may be used in a wear-resistant lifter bar assembly.

8. The extruded wear-resistant rubber composition of claim 1, wherein the extruded wear-resistant rubber composition has an effective cross-linking density of at least about $55 \times 10^{-5}$ moles/cm$^3$.

9. The extruded wear-resistant rubber composition of claim 1, wherein the extruded wear-resistant rubber composition wears at most about 30% over about 24 weeks.

10. An extruded wear-resistant rubber composition comprising:
at least one hydroxy-terminated polybutadiene;
at least one natural rubber;
at least one polymerization accelerant;
at least one sulfur;
at least one polybutadiene;
at least one silica; and
at least one silane,
wherein the extruded wear-resistant rubber composition has an effective cross-linking density of at least about $30 \times 10^{-5}$ moles/cm$^3$, and
wherein the extruded wear-resistant rubber composition wears from about 10% to about 40% over a period of time, the period of time selected from the group consisting of about 1 week, about 3 weeks, about 7 weeks, about 14 weeks, about 21 weeks, and about 24 weeks.

11. The extruded wear-resistant rubber composition of claim 10, further comprising any combination of:
an antiozonant;
a vulcanization inhibitor;
a processing additive; and
a coupling agent.

12. The extruded wear-resistant rubber composition of claim 11, wherein the extruded wear-resistant rubber composition may be used in a wear-resistant lifter bar assembly.

13. The extruded wear-resistant rubber composition of claim 10, further comprising any combination of:
an organosilane additive;
a peptizer;
a plasticizer; and
a carbon black.

14. The extruded wear resistant rubber composition of claim 13, wherein the extruded wear-resistant rubber composition wears at most about 30% over about 24 weeks.

15. A wear-resistant lifter bar assembly comprising:
at least one rack for fixing the wear resistant lifter bar to a cylindrical wall of a rotating drum of a mill; and
at least one wear body comprising an extruded wear resistant rubber composition, wherein the extruded wear resistant rubber composition comprises:
at least one hydroxy-terminated polybutadiene;
at least one natural rubber;
at least one polymerization accelerant;
at least one sulfur;
at least one polybutadiene;
at least one silica; and
at least one silane,
wherein the extruded wear-resistant rubber composition has an effective cross-linking density of at least about $30 \times 10^{-5}$ moles/cm$^3$.

16. The wear-resistant lifter bar of claim 15, wherein the extruded wear resistant rubber composition further comprises any combination of:
an antiozonant;
a vulcanization inhibitor;
a processing additive; and
a coupling agent.

17. The wear-resistant lifter bar of claim 16, wherein the extruded wear resistant rubber composition further comprises any combination of:
an organosilane additive;
a peptizer;
a plasticizer; and
a carbon black.

18. The wear-resistant lifter bar of claim 16, wherein the at least one natural rubber is present at a concentration ranging from about 20 wt. % to about 70 wt. % of the extruded wear-resistant rubber composition, and further wherein one or more of;
the at least one polymerization accelerant is selected from the group consisting of zinc oxide, stearic acid, N-cyclohexyl-2-benzothiazole sulfonamide, and tetrabenzyl thiuram disulfide;
the at least one polybutadiene is present at a concentration ranging from about 2 wt. % to about 20 wt. % of the extruded wear-resistant rubber composition; and
the at least one processing additive is present at a concentration ranging from about 1 wt. % to about 10 wt. % of the extruded wear-resistant rubber composition.

19. The wear-resistant lifter bar of claim 15, wherein the at least one hydroxy-terminated polybutadiene is present at a concentration ranging from about 1 wt. % to about 10 wt. % of the extruded wear-resistant rubber composition.

20. The wear-resistant lifter bar of claim 15, wherein the at least one hydroxy-terminated polybutadiene is present at a concentration of about 2 wt. % of the extruded wear-resistant rubber composition.

21. The wear-resistant lifter bar of claim 15, wherein the extruded wear-resistant rubber composition has an effective cross-linking density of at least about $55 \times 10^{-5}$ moles/cm$^3$.

22. The wear-resistant lifter bar of claim 15, wherein the extruded wear-resistant rubber composition wears at most about 30% over about 24 weeks.

* * * * *